US012811509B2

(12) United States Patent
Pham et al.

(10) Patent No.: US 12,811,509 B2
(45) Date of Patent: Nov. 24, 2026

(54) CURRENT SENSE COMPENSATION FOR SELF-CHARGE BIAS CURRENT

(71) Applicant: POWER INTEGRATIONS, INC., San Jose, CA (US)

(72) Inventors: Giao Minh Pham, Milpitas, CA (US); Robert J. Mayell, Los Altos, CA (US)

(73) Assignee: Power Integrations, Inc., San Jose, CA (US)

( * ) Notice: Subject to any disclaimer, the term of this patent is extended or adjusted under 35 U.S.C. 154(b) by 175 days.

(21) Appl. No.: 18/812,344

(22) Filed: Aug. 22, 2024

(65) Prior Publication Data

US 2026/0045888 A1 Feb. 12, 2026

Related U.S. Application Data

(60) Provisional application No. 63/680,899, filed on Aug. 8, 2024.

(51) Int. Cl.
*H02M 3/335* (2006.01)
*H02M 1/00* (2007.01)

(52) U.S. Cl.
CPC ..... *H02M 3/33592* (2013.01); *H02M 1/0006* (2021.05); *H02M 1/0009* (2021.05); *H02M 3/33523* (2013.01)

(58) Field of Classification Search
CPC ............. H02M 1/0006; H02M 1/0009; H02M 3/33523; H02M 3/33592
See application file for complete search history.

(56) References Cited

U.S. PATENT DOCUMENTS

| | | | |
|---|---|---|---|
| 4,005,352 | A | 1/1977 | Kugler |
| 5,014,178 | A | 5/1991 | Balakrishnan |
| 5,038,053 | A | 8/1991 | Djenguerian |

(Continued)

FOREIGN PATENT DOCUMENTS

| | | |
|---|---|---|
| CN | 103023298 | 4/2013 |
| WO | 2021126826 | 6/2021 |

OTHER PUBLICATIONS

Written Opinion of the International Searching Authority dated Aug. 25, 2025 for International Application No. PCT/US2025/027342, filed May 1, 2025; 13 pages total.

(Continued)

*Primary Examiner* — Jue Zhang
(74) *Attorney, Agent, or Firm* — Christensen O'Connor Johnson Kindness PLLC

(57) ABSTRACT

Described are systems and methods to compensate for self-charge bias current in a power converter. An example control system includes a branch node, a branch switch, first and second current mirrors, and a scaled current mirror and adder. The branch node delivers a main current and a branch current, which are respectively received by the first current mirror and the branch switch. The first current mirror scales the main current. The second current mirror is coupled to the branch switch and scales the branch current, which can also be used to charge a capacitor. A ratio between the main and scaled main currents is substantially the same as a ratio between the branch and scaled branch currents. The scaled current mirror and adder sums together the scaled main and scaled branch currents. Responsive to the summed current, the control system produces a variable drive signal to modulate the main current.

32 Claims, 15 Drawing Sheets

(56) References Cited

U.S. PATENT DOCUMENTS

| | | | |
|---|---|---|---|
| 5,245,526 | A | 9/1993 | Balakrishnan |
| 5,282,107 | A | 1/1994 | Balakrishnan |
| 5,285,369 | A | 2/1994 | Balakrishnan |
| 5,602,724 | A | 2/1997 | Balakrishnan |
| 6,583,663 | B1 | 6/2003 | Disney |
| 6,865,093 | B2 | 3/2005 | Disney |
| 7,034,625 | B2 | 4/2006 | Pham |
| 7,157,813 | B2 | 1/2007 | Djenguerian |
| 7,345,894 | B2 | 3/2008 | Sawtell |
| 7,359,222 | B2 | 4/2008 | Mayell |
| 7,489,120 | B2 | 2/2009 | Matthews |
| 7,535,735 | B2 | 5/2009 | Cuadra |
| 7,759,914 | B2 | 7/2010 | Odell |
| 7,898,826 | B2 | 3/2011 | Matthews |
| 7,932,738 | B1 | 4/2011 | Banerjee |
| 8,035,254 | B2 | 10/2011 | Djenguerian |
| 8,120,097 | B2 | 2/2012 | Disney |
| 8,179,166 | B2 | 5/2012 | Wang |
| 8,294,377 | B2 | 10/2012 | Kang |
| 8,305,063 | B2 | 11/2012 | Wang |
| 8,305,826 | B2 | 11/2012 | Banerjee |
| 8,368,370 | B2 | 2/2013 | Morrish |
| 8,779,841 | B2 | 7/2014 | Ivankovic |
| 8,933,649 | B2 | 1/2015 | Matthews |
| 9,019,728 | B2 | 4/2015 | Matthews |
| 9,093,916 | B2 | 7/2015 | Stefan |
| 9,112,428 | B2 | 8/2015 | Bailey |
| 9,219,420 | B1 | 12/2015 | Zhang |
| 9,271,352 | B2 | 2/2016 | Mao |
| 9,287,784 | B2 | 3/2016 | Zhang et al. |
| 9,331,587 | B2 | 5/2016 | Djenguerian |
| 9,479,065 | B2 | 10/2016 | Mao |
| 9,531,264 | B2 | 12/2016 | Ryan |
| 9,543,845 | B2 | 1/2017 | Carmen, Jr. |
| 9,648,676 | B2 | 5/2017 | Angeles |
| 9,667,154 | B2 | 5/2017 | Colbeck |
| 9,735,663 | B2 | 8/2017 | Bhasin |
| 9,780,666 | B2 | 10/2017 | Odell |
| 9,804,205 | B2 | 10/2017 | Duvjnak |
| 9,871,510 | B1 | 1/2018 | Horwitz |
| 9,954,461 | B1 | 4/2018 | Duvnjak |
| 9,983,239 | B2 | 5/2018 | Mayell |
| 10,038,434 | B2 | 7/2018 | Volke |
| 10,135,357 | B1 | 11/2018 | Balakrishnan |
| 10,153,689 | B2 | 12/2018 | Colbeck |
| 10,298,110 | B2 | 5/2019 | Pham |
| 10,326,306 | B2 | 6/2019 | Peter |
| 10,924,028 | B2 | 2/2021 | Duvnjak |
| 2013/0077353 | A1 | 3/2013 | Kuang |
| 2014/0265898 | A1 | 9/2014 | Carmen, Jr. |
| 2019/0393871 | A1 | 12/2019 | Springett |
| 2021/0203235 | A1 | 7/2021 | Odell |
| 2021/0257923 | A1 | 8/2021 | Odell |
| 2023/0051129 | A1 | 2/2023 | Werner et al. |

OTHER PUBLICATIONS

Broadmeadow, M., "Characterisation of the cascode gate drive of power MOSFETs in clamped inductive switching applications," doctoral thesis, Mar. 25, 2015, Queensland University of Technology, Brisbane, Australia, Chapter 4, pp. 81-85.

Jia, L., et al., "Cascode Switching Modeling and Improvement in Flyback Converter for LED Lighting Applications," IEEE 978-1-5386-1189-7/18; 2018; 8 pages.

Self-bias Operation

| | | | First Cascode | 2nd Cascode | Branch Switch | | |
|---|---|---|---|---|---|---|---|
| State | PSW | BP_REG | I1 | I2 | I6 | *I1 (total) = I2 + I6* | VB |
| A | 1 (on) | 0 | ON | ON | OFF | *I6 = 0; I2 = I1* | VB>=REF |
| B1 | | 1 | ON | OFF | ON | *If I1 < $I_{BR}$ LIMIT: I6 = I1; I2 = 0* | VB<REF |
| B2 | | 1 | ON | VAR-ON | ON | *If I1 >= $I_{BR}$ LIMIT:<br>I6 = $I_{BR}$ LIMIT; I2 = I1 - $I_{BR}$ LIMIT* | VB<REF |
| | | | | | | | |
| C | 0 (off) | x | OFF | OFF | OFF | I1 = I6 = I2 = 0 | X |

*FIG. 7*

CURRENT SENSE COMPENSATION FOR SELF-CHARGE BIAS CURRENT

CROSS-REFERENCE TO RELATED APPLICATIONS

This application claims the benefit of Provisional Application No. 63/680,899, filed Aug. 8, 2024, which is incorporated herein by reference in its entirety. This application is also related to U.S. application Ser. No. 17/401,198, which is incorporated herein by reference in their entirety.

BACKGROUND OF THE INVENTION

Field of the Invention

The present disclosure relates generally to providing operating power to electronic circuits, for example, to control circuits in power converters.

Discussion of the Related Art

Electronic devices use power to operate. Switched mode power converters, also referred to as the switching power converters, are commonly used to power many of today's electronics due to their high efficiency, small size, and low weight. Conventional wall sockets provide a high voltage alternating current. In a switched mode power converter, a high voltage alternating current (ac) input is converted to provide a well-regulated direct current (dc) output through an energy transfer element. The switched mode power converter usually provides output regulation by sensing one or more signals representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

Power converters generally include one or more controllers which sense and regulate the output of the power converter. These controllers generally require a regulated or unregulated voltage source to power the circuit components of the controller. A bias capacitor coupled to a controller may provide operating power to the circuits of the controller. The voltage across the bias capacitor is generally regulated to provide sufficient operating power for the controller.

SUMMARY OF THE DISCLOSURE

The present disclosure illustrates circuits and methods for providing self-charging of a bias capacitor through a cascode device while maintaining accurate current sensing and current limit operation of the controller. In operation, a typical switched mode power converter controls the current through an energy transfer element to provide a well-regulated output of the converter. The self-charge circuit of the present disclosure provides current to charge a bias capacitor by using a branch switch to divert some of the current from the energy transfer element. The main power-switch of the power converter is used as a shunt path to limit the current delivered to the bias capacitor. Further, a representation of the total main power-switch current is reconstructed to use for current sensing purposes such that the controller may receive an accurate current sense signal even when the branch switch is conducting current to charge the bias capacitor.

A power converter in accordance with the present disclosure may include a primary controller, also referred to as a first controller, and a secondary controller, also referred to as a second controller, which are galvanically isolated from one another by an energy transfer element (e.g., a coupled inductor, transformer, etc.). In other words, a dc voltage applied between input side and output side of the power converter will produce substantially zero current. In other examples, the power converter may not include galvanic isolation between its input and output sides.

The primary controller is configured to control a power-switch on the primary side of the power converter to control the transfer of energy from the primary winding of the energy transfer element to the secondary winding of the energy transfer element. The secondary controller is coupled to circuit components on the secondary side of the power converter. It should be appreciated that the primary side may also be referred to as the input side while the secondary side may be referred to as the output side. The secondary controller may also be configured to control a secondary switch coupled to the secondary winding of the energy transfer element, such as a transistor used as a synchronous rectifier for the power converter. Although the primary controller and the secondary controller may be galvanically isolated from one another, the secondary controller may transmit a signal to the primary controller which controls how the primary controller switches the power-switch to transfer energy to the secondary side.

In general, both the primary side and the secondary side of the power converter may include a bias capacitor to provide operating power to circuits of the primary controller or the secondary controller, respectively. The bias capacitor for the primary controller is sometimes coupled to an auxiliary (or bias) winding of an energy transfer element, such as a transformer or coupled inductor, such that the bias capacitor is charged from the auxiliary winding. The voltage across the bias capacitor is generally regulated to a sufficient level to operate circuits of the primary controller. For example, the voltage may be regulated to substantially 5 volts (V).

As mentioned above, the primary controller is configured to control a power-switch on the primary side of the isolated power converter to control the transfer of energy between the input and the output of the power converter. In one example, the power-switch may be a cascode device. A cascode device may include a first cascode switch and a second cascode switch. The first cascode switch is generally a normally on-device while the second cascode switch is generally a normally-off device. The cascode device has three terminals, a source, a gate, and a drain. In one example, the first cascode switch (e.g., normally-on device) may be a high-voltage gallium nitride (GaN) transistor, while the second cascode switch (e.g., normally-off device) may be a low-voltage metal oxide semiconductor field effect transistor (MOSFET). The source and gate of the second cascode switch (e.g., MOSFET) are used as the source and gate of the cascode device, while the drain of the first cascode switch (e.g., GaN transistor) is used as the drain of the cascode device. The source of the first cascode switch is coupled to the drain of the second cascode switch. The second cascode switch (e.g., MOSFET) is generally used to turn on and off the first cascode switch (e.g., GaN transistor). A switch that is off (or open) cannot conduct current, while a switch that is on (or closed) may conduct current. The node between the second cascode switch (normally-off device) and the first cascode switch (normally-on device) may be referred to as an intermediate node.

A typical primary controller will implement a current limit function whereby the current flowing through the power-switch when it is on is sensed and that sensed current is compared to a current limit reference such that when the sensed current reaches the current limit reference the power-switch is turned off. Some controllers require not only a current limit function, but may also implement other features or functions that make use of a scaled version of the instantaneous power-switch current. Such functions require a faithful representation of the power-switch current during the entire switching cycle. Examples of this are applications that use the analog current during the entire on-period, directly or indirectly as a control signal.

A form of self-charge (or self-bias) in a cascode device diverts current from the first cascode switch using a branch switch, and that current is received in a device supply rail (and capacitor storage). In this manner, the capacitor may be charged, and the device supply maintained, without the need for an external source of charge such as an auxiliary winding or other power supply. One such self-charge solution substantially diverts all the first cascode switch current while charging during some or all of the first cascode switch ON-time. In one example, the first cascode switch would normally be on for the entire duration of the complete cascode device ON-period. During self-charge with a branch switch, when the first cascode switch is on, and the branch switch is also on, all the first cascode switch current can be diverted from an intermediate node of the cascode device to the bias-rail supply of the system. Such a solution, however, has drawbacks. For example, if all the current is diverted from the main power-switch, it may exceed the operational ratings of a bias capacitor, and/or require a much larger branch switch to handle the current. Also, there is an issue whereby the current used to charge the bias capacitor makes the controller "blind" to the current in the first cascode switch during charging.

For a cascode device without self-charge, the second cascode switch is typically used in conjunction with an intrinsic sense FET to sense the whole current in the entire cascode device. However, when a self-charge function as described above is added, the second cascode switch is off during charge periods of the bias capacitor and thus can no longer sense the whole current in the cascode device and the current sense function is lost. For applications requiring sensing a scaled signal representative of the cascode current, this signal may be corrupted during a self-charge period. Also, for applications where a cascode device current limit is part of a first controller operation, this current limit function may be non-functional during the self-charge period.

In accordance with the present disclosure, a power converter controller may benefit from the information of a scaled signal representing the instantaneous power-switch input current through the cascode device both when a branch switch is on and also when a second cascode switch is on. This signal may be used to implement a current limit, but may also be used for any number of other functions which require faithful representation of the total cascode device current during the entire switching cycle. The power converter controller provides a way to compensate for the self-charge current, maintaining accuracy of the first cascode switch current sense and current limit during self-charge period. The controller is capable of measuring the self-charge current in a branch switch and the current in the second cascode switch and providing a recombined signal to maintain current limit operation. Another feature of the present disclosure is the ability to dynamically share currents between a branch switch and a second-cascode switch in a way such that the maximum magnitude of the branch switch charge current is controlled independently of the total cascode device current.

BRIEF DESCRIPTION OF DRAWINGS

Non-limiting and non-exhaustive embodiments of the present invention are described with reference to the following figures, wherein like reference numerals refer to like parts throughout the various views unless otherwise specified. Corresponding reference characters indicate corresponding components throughout the several views of the figures.

FIG. 7 illustrates a truth table describing operation of a self-charge circuit in accordance with the teachings of the present disclosure.

DETAILED DESCRIPTION

Figure 1:
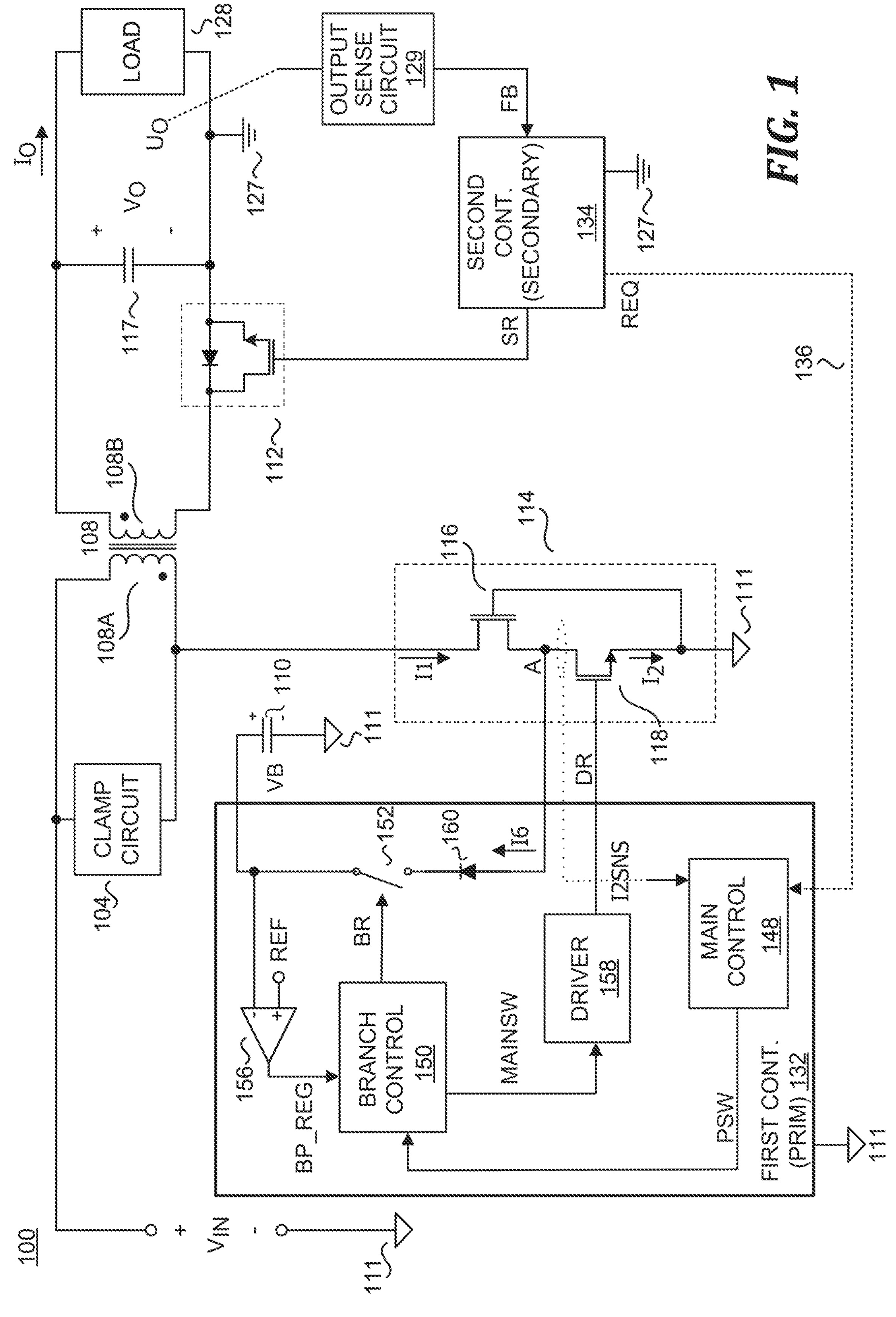
FIG. 1 illustrates an example power converter including a primary side controller that may benefit from a self-charge feature in accordance with the teachings of the present disclosure.

FIG. 1 illustrates a power converter 100 including a controller which may benefit from a self-charge circuit in accordance with the present disclosure. As explained above, the primary side of the power converter 100 may include a bias capacitor 110 to provide operating power to circuits of the primary controller 132. The bias voltage VB across the bias capacitor 110 is generally regulated to a sufficient level to operate circuits of the primary controller 132.

FIG. 1 illustrates a power converter 100 including a first controller 132 (e.g., primary controller) including a branch switch 152 and branch control 150. The power converter 100 further includes a clamp circuit 104, energy transfer element 108, an input winding 108A of the energy transfer element 108, an output winding 108B of the energy transfer element 108, a cascode device 114, an input return 111, an output rectifier 112, an output capacitor 117, an output return 127, an output sense circuit 129, a second controller 134 (e.g., secondary controller), a bias capacitor 110 (e.g., supply capacitor for the first controller 132). A communication link 136 between the second controller 134 and the first controller 132 is also illustrated. In the context of the present disclosure, the first controller 132 and the second controller 134 may be collectively referred to as a control system. The cascode device 114 is shown as including a first cascode switch 116, and a second cascode switch 118 with an intermediate node A between the first cascode switch 116 and second cascode switch 118. The first controller 132 is shown as including a main control 148, the branch control 150, the branch switch 152, a diode 160, a comparator 156, and a driver 158.

Further shown in FIG. 1 are an input voltage $V_{IN}$, a first current I1, a second cascode switch current I2, an output voltage $V_O$, an output current $I_O$, an output quantity $U_O$, a feedback signal FB, a request signal REQ, a secondary drive signal SR, a primary drive signal DR, a current sense signal I2SNS, a bias voltage VB, a main control signal PSW, a bias regulation signal BP_REG, a main switch drive signal MAINSW, a branch drive signal BR, a reference REF (e.g. bias reference), and a branch current signal I6.

The power converter 100 provides output power to a load 128 from an input voltage $V_{IN}$. In some examples, the energy transfer element 108 may be a coupled inductor, transformer, or an inductor. The energy transfer element 108 is shown as including two windings, input winding 108A (also referred to as a primary winding) and output winding 108B (also referred to as a secondary winding). The clamp circuit 104 limits the maximum voltage on the cascode device 114.

In the illustrated example, the power converter 100 is shown as having a flyback topology, but it should be appreciated that other known topologies and configurations of power converters may also benefit from the teachings of the present disclosure. Further, in one example the input side of power converter 100 is galvanically isolated from the output side of the power converter 100, such that input return 111 is galvanically isolated from output return 127. In other examples, galvanic isolation between the input and output sides may not be present.

As shown in FIG. 1, the cascode device 114 includes first cascode switch 116 and second cascode switch 118. The first cascode switch 116 is generally a normally-on device while the second cascode switch 118 is generally a normally-off device. The cascode device 114 has five terminals: a source, a gate, and a drain, an intermediate node A and a current sense signal I2SNS. In one example, the normally-on device (e.g., first cascode switch 116) may be a high-voltage transistor, while the normally-off device (e.g., second cascode switch 118) may be a low-voltage transistor. In one example, the high-voltage transistor utilized for the first cascode switch 116 may be rated to approximately 750 volts (V) while the low-voltage transistor utilized for the second cascode switch 118 may be rated approximately to between 25-40 V. The source and gate of the second cascode switch 118 (e.g., normally-off device) is used as the source and gate of the cascode device 114, while the drain of the first cascode switch 116 (e.g., normally-on device) is used as the drain of the cascode device 114. An intermediate node A is shown as the coupling between the source of the first cascode switch 116 and the drain of the second cascode switch 118. The second cascode switch 118 is generally used to turn on and off the first cascode switch 116. In one example, the first cascode switch 116 may be a transistor such as a gallium nitride (GaN) based transistor or a silicon carbide (SIC) based transistor. The second cascode switch 118 may be a transistor such as a metal-oxide-semiconductor field-effect transistor (MOSFET), bipolar junction transistor (BJT), or an insulated-gate bipolar transistor (IGBT). In one example, the current conducted by the first cascode switch 116 is denoted by the first current I1 while the current conducted by the second cascode switch 118 is denoted as the main current I2, a branch current I6 is denoted as the current conducted from node A to branch switch 152 and a sense signal I2SNS substantially coupled to the main current I2. In other examples, instead of a cascode device 114, a high-voltage lateral transistor or a high-voltage vertical transistor may be used as the power-switch. As may be understood from FIG. 1, current I1 is also the current conducted by the input winding 108A.

Output winding 108B is coupled to the output rectifier 112, which is exemplified as a transistor used as a synchronous rectifier. However, the output rectifier may be exemplified as a diode. Output capacitor 117 is shown as being coupled to the output rectifier 112 and the output return 127. The power converter 100 further includes circuitry to regulate the output quantity $U_O$, which in one example may be the output voltage $V_O$, output current $I_O$, or a combination of the two. The output sense circuit 129 is configured to sense the output quantity $U_O$ to provide the feedback signal FB, representative of the output of the power converter 100, to the second controller 134.

The second controller 134 is configured to output the request signal REQ in response to the feedback signal FB. An example of the request signal REQ is a signal representative of a request to turn ON the cascode device 114.

The second controller 134 and the first controller 132 may communicate via communication link 136. For the example shown, the second controller 134 is coupled to the secondary side of the power converter 100 and is referenced to the output return 127 while the first controller 132 is coupled to the primary side of the power converter 100 and is referenced to the input return 111.

In one example, the first controller 132 and second controller 134 may be formed as part of an integrated circuit that is manufactured as either a hybrid or monolithic integrated circuit. In one example, the cascode device 114 may also be integrated in a single integrated circuit package with the first controller 132 and the second controller 134. In addition, in one example, first controller 132 and second controller 134 may be formed as separate integrated circuits. The cascode device 114 may also be integrated, in whole or in part, in the same integrated circuit as the first controller 132 or could be formed on its own integrated circuit.

The first controller 132 is coupled to receive a current sense signal I2SNS, substantially coupled to the main current I2, wherein if branch current I6 is substantially zero (when branch switch 152 is open), the current sense signal I2SNS is substantially representative of the first current I1 of the cascode device 114. The first controller 132 further receives the request signal REQ through the communication link 136 and outputs the primary drive signal DR. The first controller 132 provides the primary drive signal DR to the cascode device 114 to control various switching parameters of the cascode device 114 to control the transfer of energy from the input of to the output of the power converter 100 through the energy transfer element 108. Examples of such parameters include switching frequency $f_{SW}$ (or switching period $T_{SW}$), duty cycle, first current I1, on-time and off-time, or varying the number of pulses per unit time of the cascode device 114. In addition, the cascode device 114 may be controlled such that it has a fixed switching frequency or a variable switching frequency.

Bias capacitor 110 is coupled to the first controller 132 and receives self-charge current I6 to charge the bias capacitor 110 through switch 152 and diode 160. Bias capacitor 110 provides operational power for the circuits of the first controller 132. Although the example of FIG. 1 is illustrated with a single branch switch 152 and a single bias capacitor 110, it will be appreciated that multiple branch switches and/or multiple bias capacitors may be employed consistent with the teaching of the present disclosure.

The first controller 132 is shown as including main control 148, branch control 150, branch switch 152, a diode 160, comparator 156, and driver 158. As mentioned previously the first controller 132 is coupled to receive a current sense signal I2SNS. When branch current I6 is substantially zero (when branch switch 152 is open), the current sense signal I2SNS is substantially a scaled version of the first current I1 of the cascode device 114. However, when branch current I6 is greater than zero (when branch switch 152 is closed or at least partially conducting), some (or all) of first current I1 is diverted away from the second cascode switch 118 and the current sense signal I2SNS does not represent first current I1. In fact, if all of the first current I1 were to be redirected as branch switch current I6 through the branch switch 152, then current sense signal I2SNS would be substantially zero. In this way the controller 132 sensing current sense signal 12SNS would be blind to first current I1 if substantially all of the first current I1 were redirected to the bias capacitor 110 as branch current I6. This could cause a problem for the first controller 132, since the first controller 132 requires the current sense signal I2SNS to accurately track the first current I1 in order for the system control to function optimally. As explained in more detail below, circuits and methods are disclosed to allow first controller 132 to control branch switch 152 to provide charge for bias capacitor 110, while preserving the current sensing functionality of first controller 132.

Comparator 156 is coupled to the bias capacitor 110 and receives the bias voltage VB at its inverting input. Comparator 156 also receives reference REF, also referred to as a bias reference, at its non-inverting input. Output BP_REG of the comparator 156 is a logical result of the comparison of the bias voltage VB less than the reference REF. In one example, reference REF is representative of the desired regulated value for the bias voltage VB. As shown, the bias regulation signal BP_REG is a logic high value if the bias voltage VB is less than the reference REF and a logic low value if the bias voltage VB is greater than the reference REF. It should be appreciated that the comparator 156 may also include hysteresis.

Main control 148 is configured to receive the request signal REQ and the current sense signal I2SNS and outputs the signal PSW. It should be appreciated that the main control signal PSW has two states, on (asserted) and off (deasserted). In one example, the signal PSW is a rectangular pulse waveform with varying duration of logic high and logic low sections. The main control signal PSW is a request to turn-on or turn-off the cascode device 114, however main control signal PSW is coupled to the branch control 150 which will generate two further signals, the branch switch drive signal BR and the main-switch signal MAINSW. Driver 158 is coupled to receive MAINSW signal and, in turn, outputs DR signal. A logic high value for the main control signal PSW (e.g., asserted) corresponds to a request to deliver power to the output. A logic low value for the main control signal PSW (e.g., deasserted) corresponds to a request to stop delivering power to the output.

Main control 148 determines the operation of the cascode device 114 in response to the request signal REQ. In operation, the main control 148 determines to turn ON the cascode device 114 in response to a request event in the request signal REQ. The state of the main control signal PSW also determines when to turn OFF the cascode device 114. In one example cascode device 114 is turned off in response to the current sense signal I2SNS indicating the first current I1 has reached a current limit ILIM.

Branch control 150 is configured to receive the main control signal PSW, and the bias regulation signal BP_REG and output the branch drive signal BR and the main switch signal MAINSW. The branch drive signal BR is the control signal to turn ON and OFF the branch switch 152 and in one example is a rectangular pulse waveform with varying durations of logic high and logic low sections. Logic high sections represent an asserted signal to turn ON branch switch 152 while logic low sections represent a deasserted signal to turn OFF branch switch 152.

The branch switch 152 and diode 160 are shown as coupled between the intermediate node A of cascode device 114 and the bias capacitor 110. The branch current I6 is the current conducted by the branch switch 152. For the example shown, one end of branch switch 152 is coupled to the intermediate node A of the cascode device 114 while the other end is coupled to the anode of diode 160. Cathode of diode 160 is coupled to the bias capacitor 110. Diode 160 is utilized to prevent (reverse) current from flowing from the bias capacitor 110 to the cascode device 114. As shown, the sum of the branch current I6 and the main current I2 is substantially the first current I1, or mathematically: I1=I6+I2.

Figure 2:
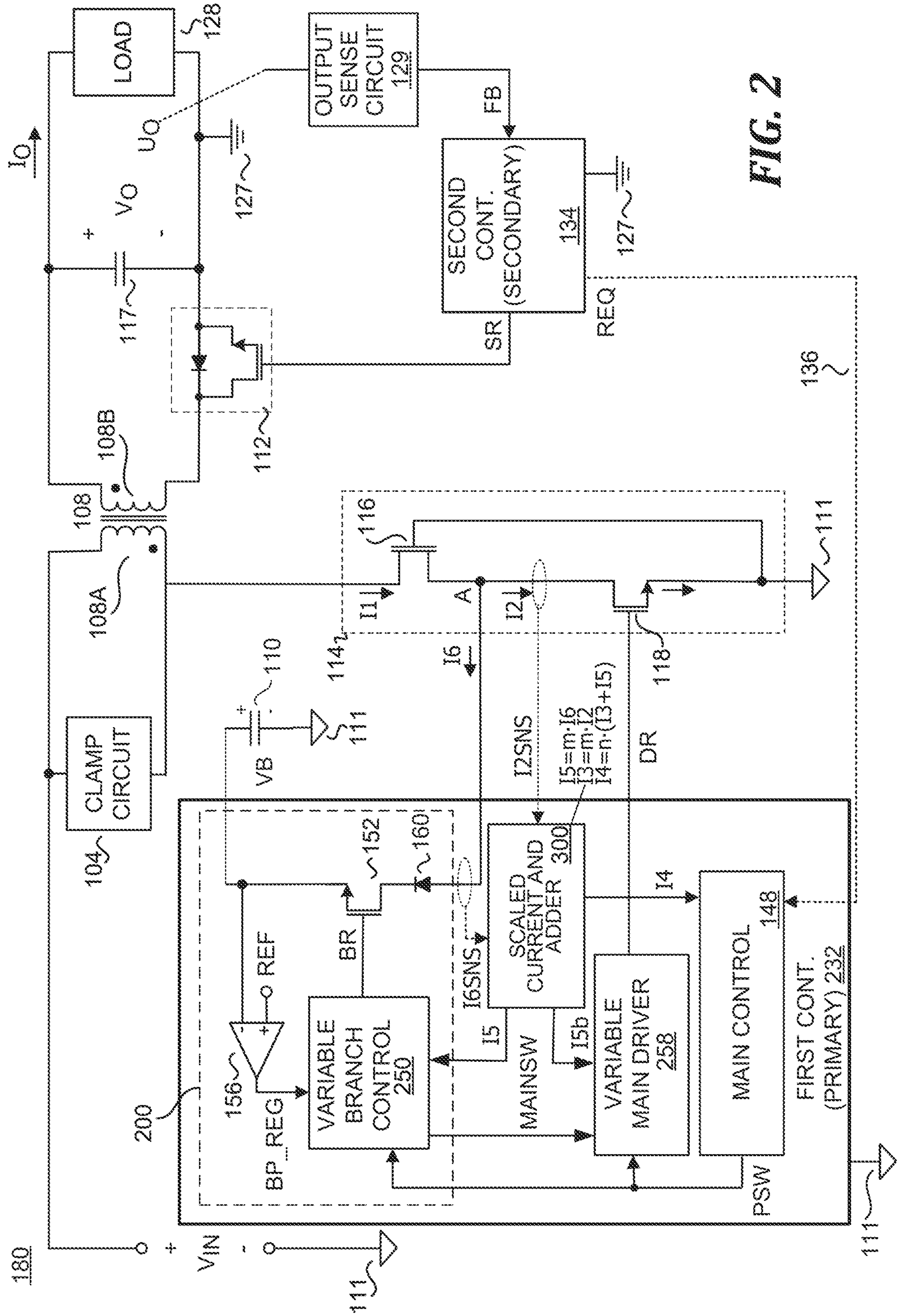
FIG. 2 illustrates an example power converter employing a primary side controller with an example self-charge feature in accordance with the teachings of the present disclosure.

FIG. 2 illustrates another example power converter 180 with a first controller 232 including variable branch control 250, variable main driver 258, and scaled current mirror and adder 300, in accordance with the teachings of the present disclosure. Here, the same reference numerals represent substantially similar components as in FIG. 1 and it should be appreciated similarly numbered elements couple and function as described above. Furthermore, some components, e.g., the first controller 232, are represented using simplified schematics in FIG. 2. At least one difference, however, is the addition of the scaled current mirror and adder 300.

The first current I1 represents drain-to-source current through the first cascode switch 116 of the cascode device 114, main current I2 represents drain-to-source current through the second cascode switch 118 of the cascode device 114 and the branch current I6 represents the drain-to-source current through the branch switch 152. The branch switch 152 is exemplified as a MOSFET in FIG. 2. The power converter 180 includes a low voltage branch tap 200. The low voltage branch tap 200 feeds the bias capacitor 110, which is a supply capacitor for the first controller 232. Current sense signal 16SNS represents a sensed version of drain-to-source current I6 through the branch switch 152. The scaled current mirror and adder 300 receives current I6SNS and outputs scaled branch current I5 to the variable branch control 250. Current sense signal I2SNS represents a sensed version of main current I2 through second cascode switch 118. The scaled current mirror and adder 300 receives current sense signal 12SNS and generates scaled main current I3. Also, scaled current mirror and adder 300 generates current I4 which is the scaled sum of scaled main current I3 and scaled branch current I5. Current I4 is a reconstruction representative of the main current I1. Accordingly, current I4 may be used by main control 148 to implement a current limiting function or other function requiring sensing the current through cascode device 114. In different embodiments, scaled current mirror and adder 300 and low voltage branch tap 200 can be implemented in digital, analog, or combined digital and analog forms. The sample embodiments of the low voltage branch tap 200 and the scaled current mirror and adder 300, as well as the relationships among the currents I1-I6, are discussed in more detail below in connection to FIG. 3A. As will be described in more detail below, variable main driver 258 receives a scaled version of the branch current I6 and generates a variable drive signal DR to control the gate of second cascode switch 118. In one embodiment, variable main driver 258 may receive scaled branch current I5*b*. Alternatively, variable main driver 258 may receive sense current I6SNS. Variable main driver 258 controls second cascode switch 118 to pass more or less current to ensure that branch current I6 does not exceed a threshold current.

Although the example of FIG. 2 describes variable branch control 250, variable main driver 258, and scaled current mirror and adder 300 in the context of a power converter 180, it will be appreciated that applications other than power converters may also benefit from a self-charge control system in accordance with the teachings of the present disclosure.

Figure 3A:
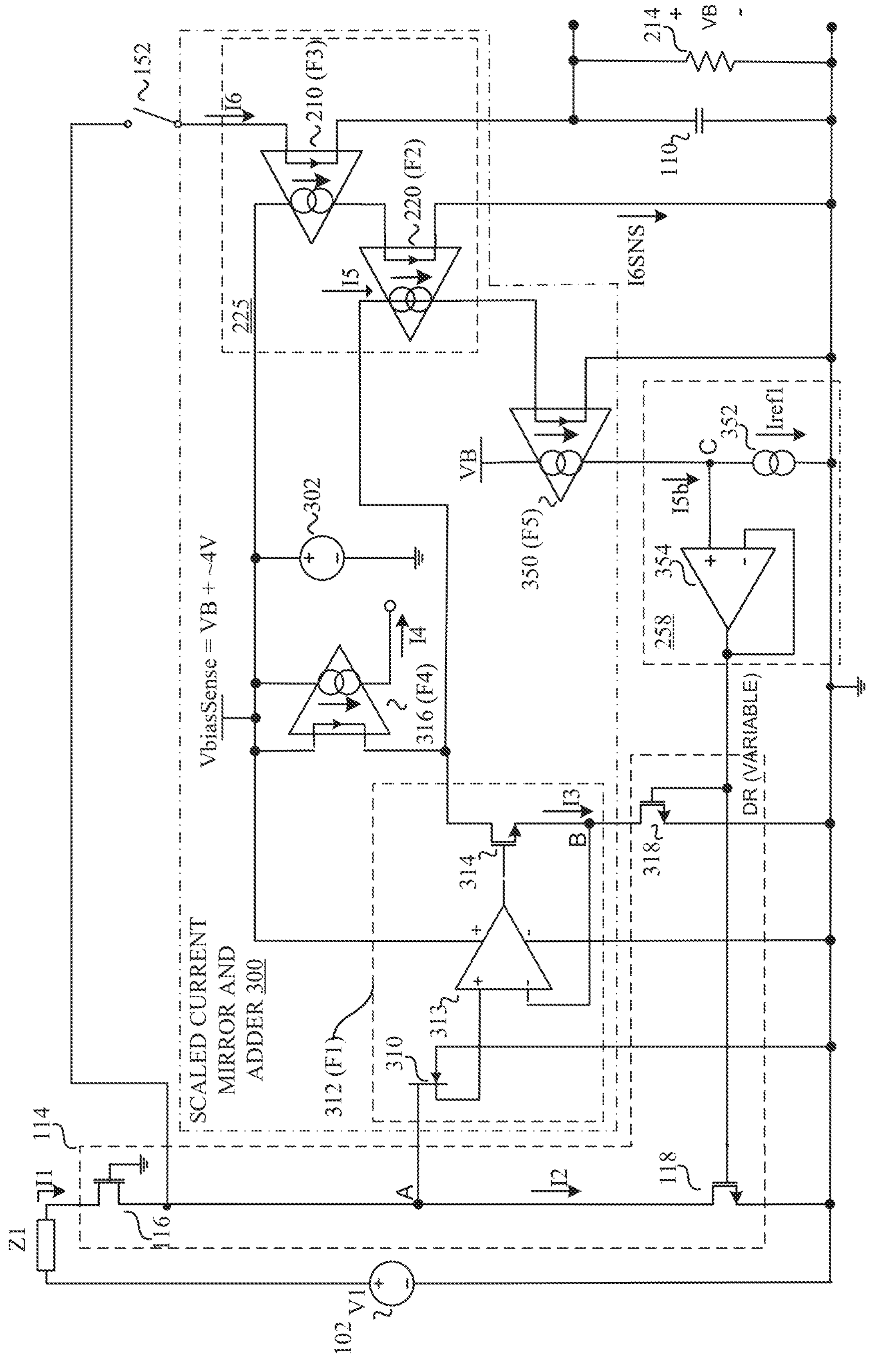
FIG. 3A illustrates example circuitry for controlling the current to charge a bias capacitor in accordance with the teachings of the present disclosure.

FIG. 3A illustrates example circuitry for controlling the current used to charge bias capacitor 110 in accordance with the teachings of the present disclosure. Different components of the circuit are grouped together for easier understanding into the following groups: a cascode device 114, a scaled current mirror and adder 300, and variable main driver 258. The cascode device 114 is coupled to a power supply 102 through impedance Z1. Supply 102 and impedance Z1 are simplified representations corresponding to the input voltage and the impedance of primary winding 108A in FIG. 2 and voltage V1 corresponds to the input voltage $V_{IN}$. In the example of FIG. 3A, the branch switch 152 redirects a portion, e.g., the branch current I6, of the first current I1 to charge the bias capacitor 110 and the second cascode switch 118 is utilized to control the remainder (main current I2) of the first current I1 which is not redirected to charge the bias capacitor 110.

As explained above, the cascode device 114 includes the first cascode switch 116 and the second cascode switch 118. When any current is passing through the cascode device, first current I1 (the total current into the first cascode switch 116) passes through first cascode switch 116. The first current I1 then splits into the main current I2 through the second cascode switch 118 (when the second cascode switch 118 is in an ON state) and the branch current I6 (when the branch switch 152 is in an ON state). Stated differently, the sum of main current I2 and branch current I6 substantially equals the total current in the first cascode switch 116, i.e., I1=I2+I6. The branch current I6 (the self-charge current) passes through branch switch 152 and charges the bias capacitor 110. The resistor 214 represents a quiescent load on the bias capacitor 110. In some non-limiting embodiments, the resistance of resistor 214 represents the quiescent consumption on the VB voltage-rail and resistor 214 may be on the order of 10 kOhm-100 kOhm.

Current mirror 312 (F1) includes normally-on transistor 310, operational amplifier (commonly referred to as an "op-amp") 313, and transistor 314. Normally-on transistor 310 is coupled to node A. In operation, normally-on transistor 310, acts as a voltage clamp, and passes only a low-voltage portion of the signal at node A. The output of 310 passes to the non-inverting input of op-amp 313. Op-amp 313, in conjunction with transistor 314, acts as a voltage-to-current converter. The inverting input of op-amp 313 is coupled to node B at the source of transistor 314 and drain of transistor 318. The output of op-amp 313 is coupled to the gate of transistor 314. In operation, op-amp 313, in combination with blocking transistor 310, and transistor 314, form a voltage-to-current mirror whose input is the drain of transistor 310 (i.e., node A) and whose output is the source of transistor 314 (i.e., node B). The input difference (between signals at the non-inverting and inverting inputs of the op-amp 313), is multiplied with high gain to feed the gate of transistor 314. In some embodiments, the op-amp 313 may have a gain-bandwidth product (GBWP) of 10 MHz and open loop differential gain (Ao) on the order of 106. The voltage gain of transistor 314 may also be in the same range. The components together operate as a feedback system such that any difference between the voltages at node A and node B will generate a correction current I3 into senseFET 318, and thus modify the voltage across the Rds (on) of senseFET 318 which will, in turn, minimize the node A to node B voltage difference. In this way the voltage at node B will substantially match the voltage at node A (i.e., the voltage at the drain of transistor 310). The output of op-amp 313 drives the gate of transistor 314, generating a scaled main current I3 such that the voltage at node B substantially matches the voltage at node A and thereby where I3 is substantially m-times the current I2.

The second cascode switch 118 and low side (LS) senseFET 318 are explicitly matched in all parameters except size. Their active area and thus their rds(on) are proportional to one another in such a way that LS senseFET 318 is a smaller ratiometric version of the second cascode switch 118. LS senseFET 318, for example a MOSFET, is scaled such that the rds(on) of LS senseFET 318 is the reciprocal of m times the rds(on) of second cascode switch 118. In one example, the ratio m will be a small fraction, less than 1. A person of ordinary skill would understand that rds(on) stands for a resistance between the drain-source when MOSFET is in its ON state at the specified gate-voltage. In this way, a scaled main current I3 passing through the rds(on) of LS senseFET 318 will generate a drain-source voltage at node B substantially equal to the drain-source voltage at node A to a ratiometrically larger main current I2 passed through the rds(on) of the second cascode switch 118. If the voltages at node A and node B (e.g. the input and output of the voltage mirror formed from transistor 310, op-amp 313, and transistor 314) are forced to be substantially equal, then the scaled main current I3 required to generate the voltage at node B, will be ratiometrically proportional to the main current I2 generating the voltage at node A. By forcing the voltage at node B to be substantially equal to the voltage at node A, a scaled main current I3 may be produced which will therefore be a ratiometric copy of the main current I2. In this way, the scaled main current I3 is a sense current of the main current I2. In some embodiments, based on the above-described bandwidth and gain of components, the initial error in scaled main current I3 may almost completely settle (i.e., settle to a fraction of its initial value) within about 660 ns.

In the illustrated embodiment, the main current I2 and the scaled main current I3 are related as I3=m·I2, where m is a coefficient that can be implemented through the design of the first current mirror 312 (F1). Therefore, the scaled main current I3 is scaled based on the main current I2. The scaled main current I3 flows through LS senseFET 318.

In some embodiments, a cascaded current mirror 225 may include current mirror 210 (F3) and current mirror 220 (F2). The cascaded current mirror 225 operates to mirror the bias capacitor 110 charge current, e.g., branch current I6, and outputs a scaled branch current I5. The gain m of the cascaded current mirror 225 is the same as that of the first current mirror 312 (F1). Therefore, the scaled branch current I5 and the scaled main current are I5=m·I6 and I3=m·I2, respectively, where m is a coefficient based on the design of the current mirrors. As would be understood by person of ordinary skill, a current mirror is a circuit designed to copy and scale an input current through one (or more) active device by controlling the output current in another active device (or devices) of a circuit, therefore keeping the output current constant regardless of output loading. The current being mirrored ("scaled and copied") can be a varying signal current. The current mirror may be used to provide bias currents and active loads to circuits. In some embodiments, the current mirror can be implemented using MOSFET transistors or BJT transistors.

The scaled main current I3 and the scaled branch current I5 are added together and input to a fourth current mirror 316 (F4). The fourth current mirror 316 (F4) receives the sum of scaled main current I3 and scaled branch current I5, and outputs a scaled summed current I4 with a current mirror ratio of n. Current I4 is representative of the total cascode device current and may be output to, for example, main control 148 to implement a current limit function. Based on the above-described current splitting and current mirror, the overall relationship between the currents can be expressed as:

$$I4 = n\cdot(I3 + I5) = n\cdot(m\cdot I2 + m\cdot I6) == n\cdot m\cdot I1 \quad \text{Equation 1}$$

Voltage source 302 provides internal bias for the operation of scaled current mirror and adder 300 and is used to generate the voltage at the VbiasSense rail which in one example is maintained at the bias voltage VB plus approximately 4 volts. Scaled current mirror and adder further includes a fifth current mirror 350 (F5). The fifth current mirror 350 (F5) receives the scaled branch current I5 from cascaded current mirror 225, which is mirrored with unity gain as output I5*b*. The output I5*b* is used in the variable main driver 258 as discussed below. Although scaled current mirror and adder 300 and cascaded current mirror 225 are described in the context of the embodiment of FIG. 3A as processing current signals, as a person of ordinary skill in the art would understand, the described current signals could alternatively be converted to voltages and sensed, scaled and/or added or otherwise processed as voltages without departing from the scope of the present disclosure. In such an alternative, for example, scaled current mirror and adder 300 could be implemented as a voltage scaler and adder circuit.

The variable main driver 258 includes an input for receiving I5*b*, a reference current source 352, and a unity voltage buffer 354. The unity voltage buffer 354 has a inverting input coupled to the output of buffer 354 and a non-inverting input that receives the voltage at node C. The voltage at node C is a voltage generated by the comparison of two currents, I5*b* and reference current Iref1 from reference current source 352. Reference current Iref1 is pulling to ground. If I5*b*<Iref1, then the voltage at node C will pull lower. Conversely if I5*b*>Iref1, the voltage at node C will pull higher. In this way the non-inverting input of the unity voltage buffer 354 receives a voltage signal dependent on the comparison of I5*b* and Iref1. One of ordinary skill will appreciate that the voltage of node C would be limited to a minimum of local-ground and a maximum of VB. The output of the unity voltage buffer 354 provides the variable primary drive signal DR to the gates of both the second cascode switch 118 and LS senseFET 318.

In operation, when the gate-voltage on a MOSFET is reduced, it will reduce the conduction of the transistor and the current passed by the MOSFET. Conversely if the gate-voltage of a MOSFET is increased, it will increase the conduction of the transistor and the current passed by the MOSFET. Controlling the gate-voltage of the second cascode switch 118 (and LS senseFET 318) controls the main current I2. As explained above, the scaled branch current I5 is proportional to branch current I6. The main current I2 is the main power-switch current. The gate of the second cascode switch 118 (and LS senseFET 318) are controlled to limit the maximum value of current I5*b* (which is a scaled version of branch current I6) at or below the reference current Iref1. Thus, the gates of the second cascode switch 118 (and LS senseFET 318) are driven such that the second cascode switch 118 will conduct more current (i.e., a larger portion of current I1) in order to ensure that branch current I6 does not exceed a threshold current (IBRLIMIT).

Figure 3B:
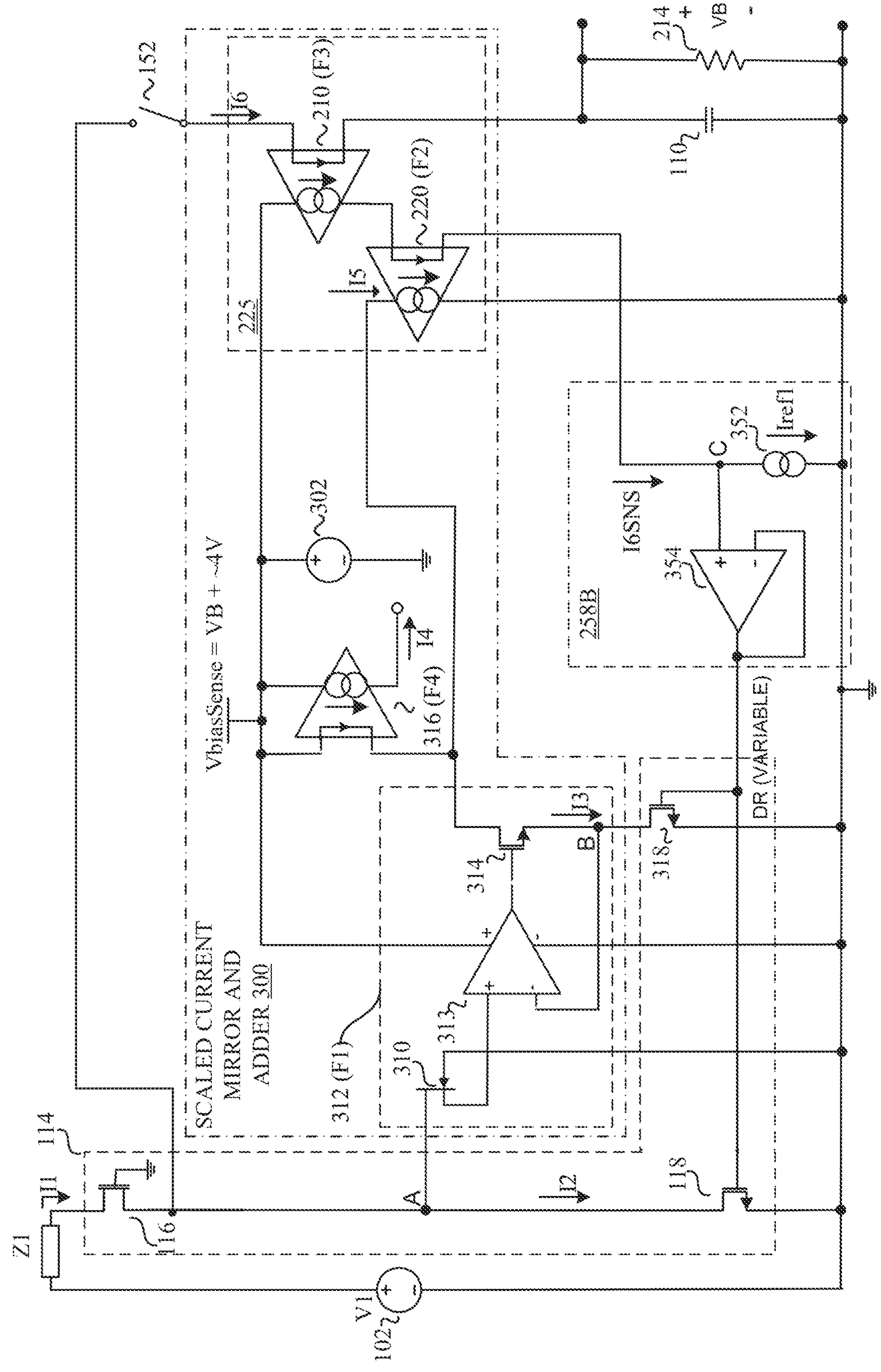
FIG. 3B illustrates another example circuit for controlling the current to charge a bias capacitor in accordance with the teachings of the present disclosure.

FIG. 3B illustrates another example of circuitry for controlling the current used to charge bias capacitor 110 in accordance with the teachings of the present disclosure. The example of FIG. 3B is substantially the same as FIG. 3A and the descriptions above of the corresponding components apply equally. What is different in the example of FIG. 3B is that the input to variable main driver 258B is sense signal I6SNS, instead of signal I5*b*. In the example of FIG. 3B, I6SNS, which is a fixed ratio of branch current I6, is compared to reference current Iref1 to generate the variable drive signal. The gate of the second cascode switch 118 (and LS senseFET 318) are controlled to limit the maximum value of current I6SNS (which is a fixed ratio of branch current I6) at or below the reference current Iref1. Thus, the gates of the second cascode switch 118 (and LS senseFET 318) are driven such that the second cascode switch 118 will conduct more current (i.e., a larger portion of current I1) in order to ensure that branch current I6 does not exceed a threshold current (IBRLIMIT).

Figure 4:
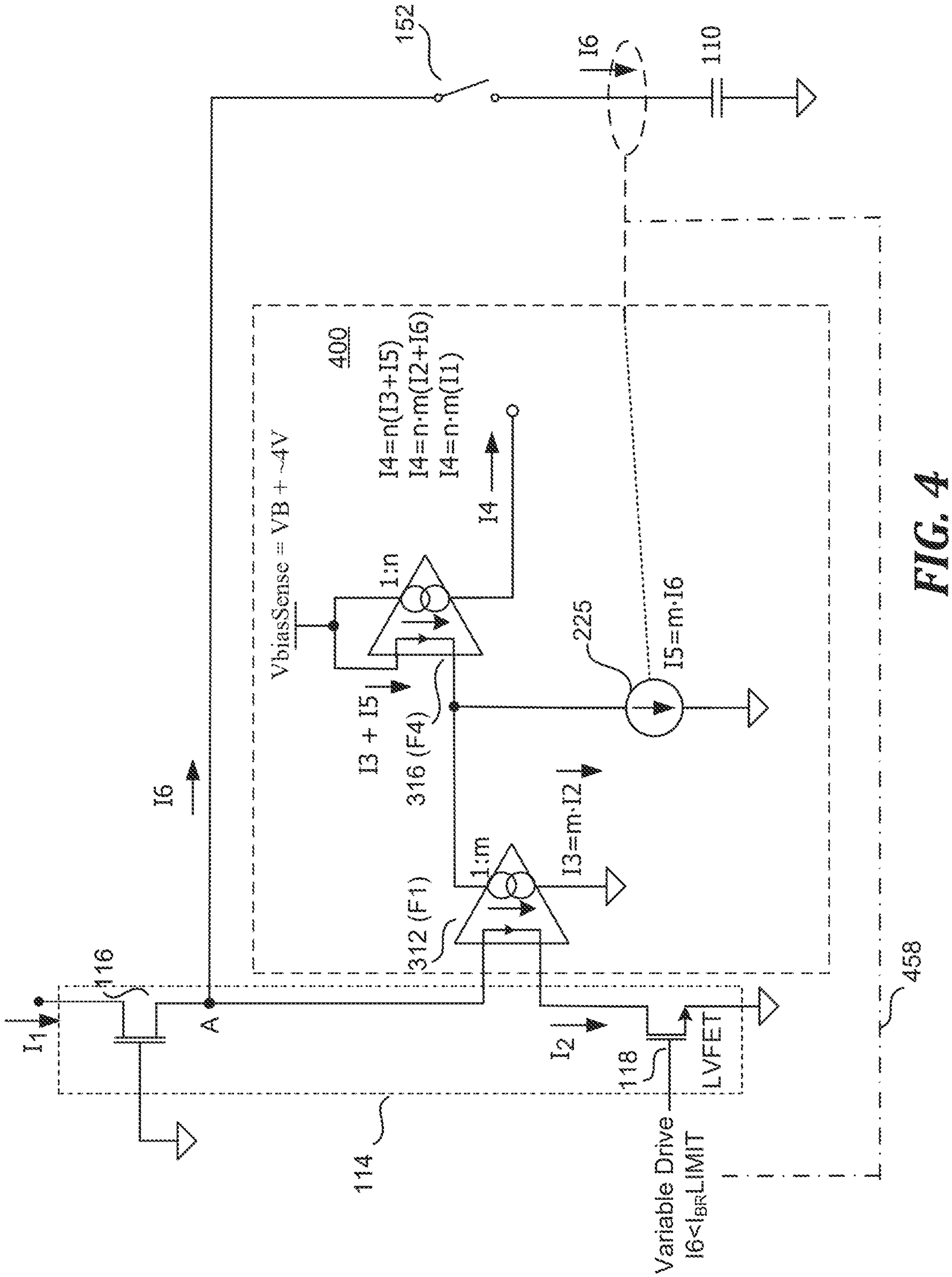
FIG. 4 illustrates an example current mirror and adder in accordance with the teachings of the present disclosure.

FIG. 4 illustrates an example scaled current mirror and adder 400 in accordance with the teachings of the present disclosure. The structure and operation of scaled current mirror and adder 400 generally corresponds to the scaled current mirror and adder 300 described with reference to the circuit of FIG. 3A or 3B above. A first current mirror 312 (F1) senses main current I2 and mirrors and scales it to provide the scaled main current I3. Current source 225 represents a cascaded current mirror that senses branch current I6 and generates scaled branch current I5. Trace 458 represents generating the variable drive signal in response to scaled branch current I5. In the example of FIG. 3B, the variable drive signal is alternatively generated in response to I6SNS. The fourth current mirror 316 (F4) sums the scaled main current I3 and the scaled branch current I5 and outputs summed current I4. The scaled current mirror and adder 400 of FIG. 4 includes the first current mirror 312 (F1) and fourth current mirror 316 (F4), that collectively generate the summed current I4, where the summed current I4 is the recombined total cascode switch current, e.g., first current I1, of the first cascode switch 116. As explained above and as illustrated in FIG. 4, the summed fourth current I4 may be represented mathematically with:

$$I4 = n\cdot(I3 + I5) = n\cdot(m\cdot I2 + m\cdot I6) = n\cdot m\cdot I1 \quad \text{Equation 2}$$

FIGS. 5A-5J illustrate example waveform diagrams in accordance with the teachings of the present disclosure. All the waveform diagrams share the same horizontal axis representing time in 50 us per division, going from 0 us to about 260 μs. Collectively, graphs in FIGS. 5A-5J can be described as waveforms showing the compensation for the self-charging current.

Figure 5A:
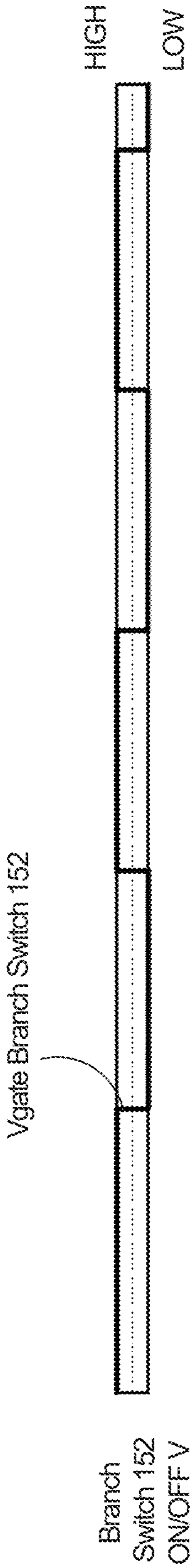
FIGS. 5A-5J illustrate example waveform diagrams of signals shown in FIG. 2 in accordance with the teachings of the present disclosure.

FIG. 5A illustrates periods of the gate voltage of branch switch 152 being in the ON position as value "high" and periods of the gate voltage of branch switch 152 being in the OFF position as value "low." When the gate of branch switch 152 is in its ON state, the bias capacitor 110 is charged by branch current I6, and when the gate of branch switch 152 is in its OFF state, the bias capacitor 110 is not being charged by branch current I6. The bias capacitor 110 is charged when the branch current I6 is non-zero and positive.

Figure 5B:
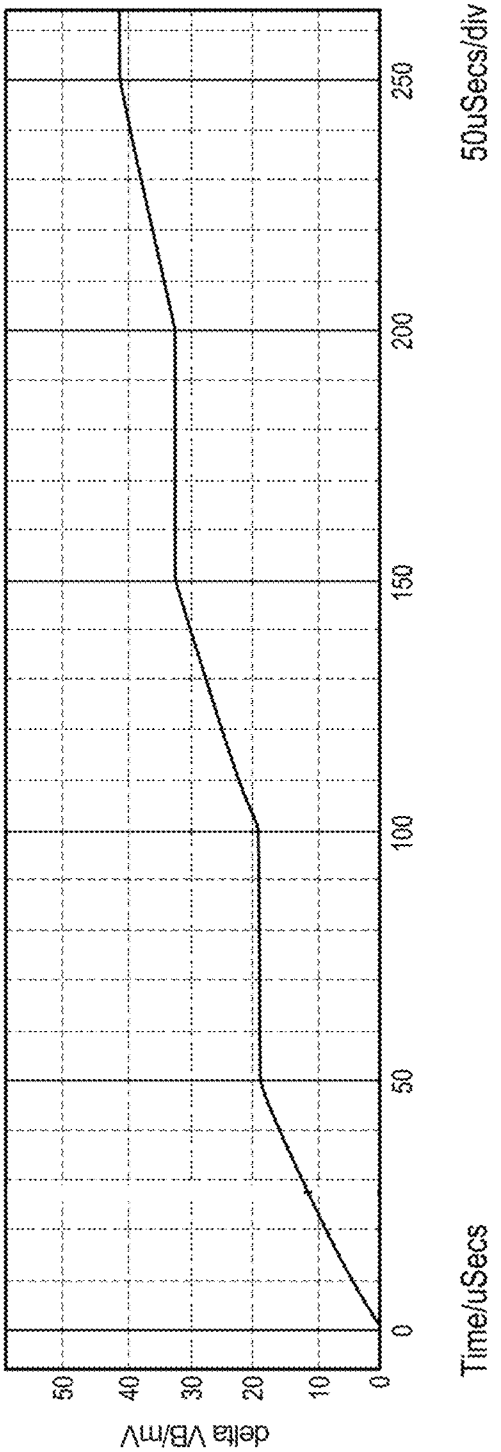

FIG. 5B illustrates charging of the bias capacitor 110, that is, positive voltage change (delta VB) between the plates of the bias capacitor 110. The vertical axis shows increasing charge of the bias capacitor 110 as the voltage delta VB between the plates of the bias capacitor 110 changes. The periods of the voltage increase correspond to the periods of non-zero positive value of the self-charge current, e.g., branch current I6, which charges the bias capacitor 110. The periods where delta VB voltage is relatively flat correspond to the periods of time when the self-charge current, e.g., branch current I6 is essentially zero, thus no additional charging of the bias capacitor 110 takes place.

Figure 5C:
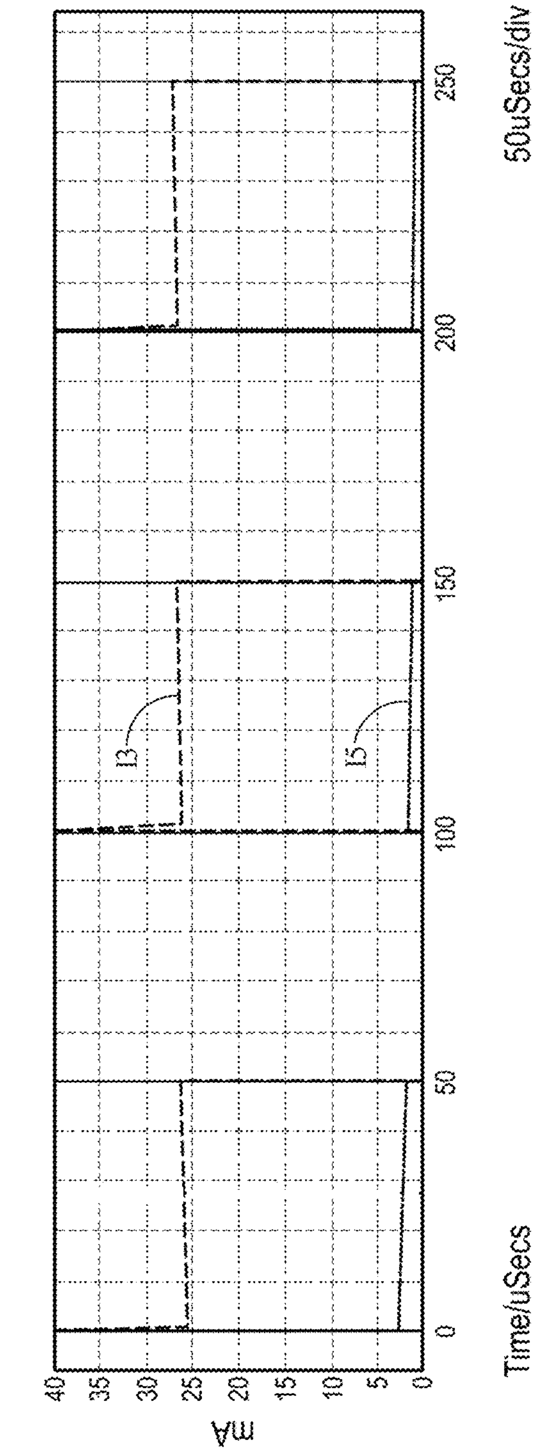

FIG. 5C illustrates switching periods of the main power-switch 114. In the example shown, the main power-switch 114 is ON from time 0-50 μs, is ON again from 100-150 us and again from 200-250 μs. In the example shown, the period for the main power-switch includes a 50 μs ON-time and then a 50 μs OFF-time. In this example, branch switch 152 is ON whenever the main power-switch 114 is ON. As illustrated, the scaled main current I3 and the scaled branch current I5 are shown over time. The scaled main current I3 is shown in a dashed line while the scaled branch current I5 is shown as a dashed and dotted line. As explained above, a summed current I4 represents the first current I1. The summed current I4 can be mathematically expressed as:

$$I4 = m \cdot n \cdot I1 = n \cdot (I3 + I5) \quad \text{Equation 3}$$

In the illustrated embodiment, the scaled main current I3 and the scaled branch current I5 are non-zero during the ON times of the first cascode switch 116 of the cascode device 114. Also in this example, the scaled main current I3 is always significantly greater than the scaled branch current I5 during the ON times of the first cascode switch 116.

Figure 5D:
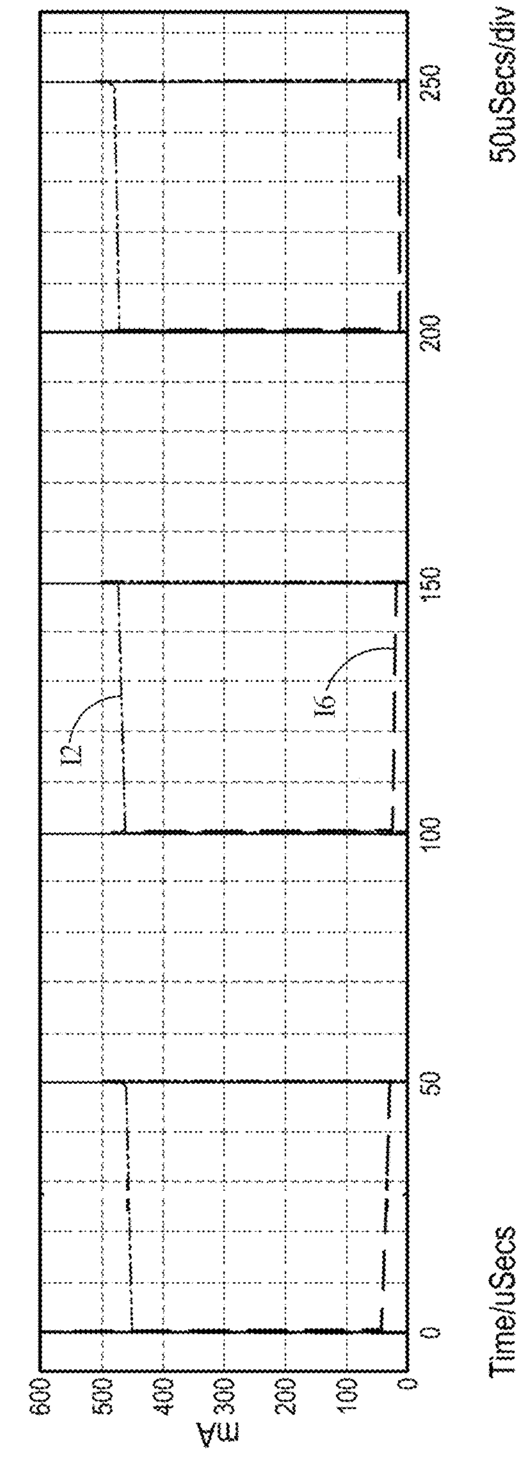

FIG. 5D illustrates the main current I2 (current through the second cascode switch 118) and the branch current I6 (the self-charge current) over time. The main current I2 is shown in a dashed and dotted line while branch current I6 is shown in a large dashed line. Again, the main current I2 and the branch current I6 are non-zero during the ON times of the first cascode switch 116 of the cascode device 114. In the illustrated embodiment, the main current I2 is significantly greater than the branch current I6. Also, during successive cycles, the value of the branch current I6 reduces (as the bias capacitor 110 is charged) and the value of the main current I2 increases by an equal amount. In other examples, the value of the branch current I6 would be maintained constant as the bias capacitor is charged. Generally, a relatively small branch current is desired for charging the bias capacitor 110, especially so in view of different nominal values for the input voltage $V_{IN}$. For example, in some embodiments, during the ON times of the first cascode switch 116, the branch current I6 may be about 40 mA, while the main current I2 may be about 460 mA. However, in different embodiments these currents may have different values. Setting aside the transient effects, the first current I1 (total current into first cascode switch 116 while it is on) is equal to the sum of the main current I2 and the branch current I6 or, expressed mathematically:

$$I1 = I2 + I6 \quad \text{Equation 4}$$

Figure 5E:
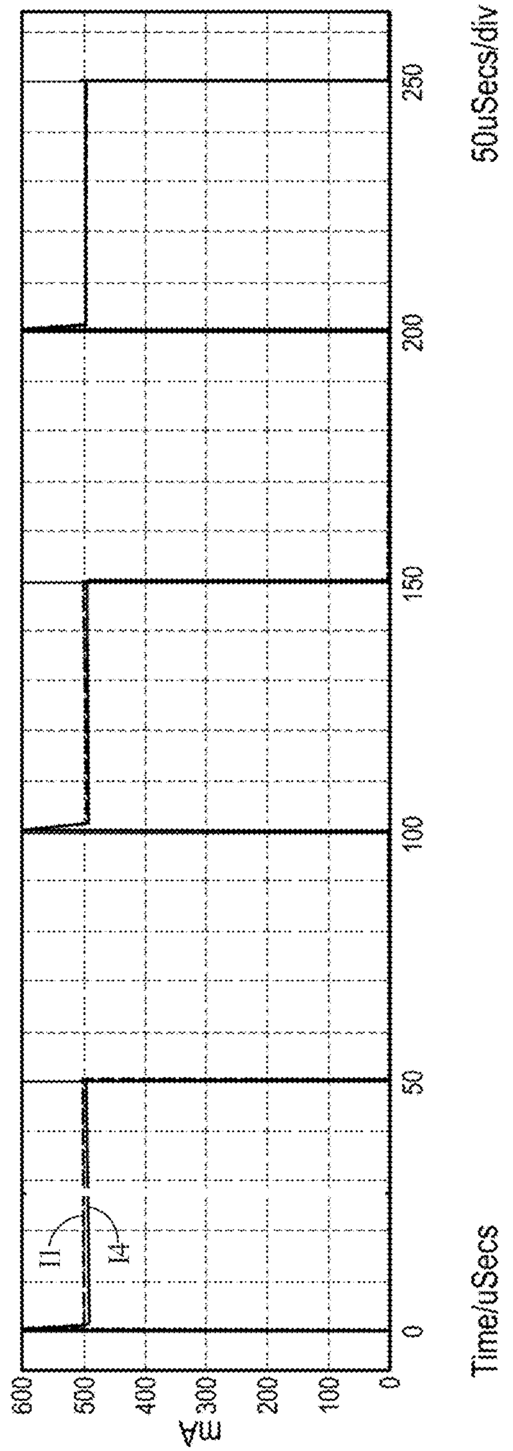

FIG. 5E illustrates the first current I1 (total current into the first cascode switch 116 of the cascode device 114) and the summed current I4 (total sensed current of the first cascode switch 116) over time. As can be seen from FIG. 5E, if the scaling factors m and n are chosen such that m·n=1, as has been done in the discussed example to simplify the explanation, the first current I1 and the summed current I4 are substantially the same (again, setting aside the transient effects). The first current I1 is shown in a dashed line while summed current I4 is shown as a solid line.

Figure 5F:
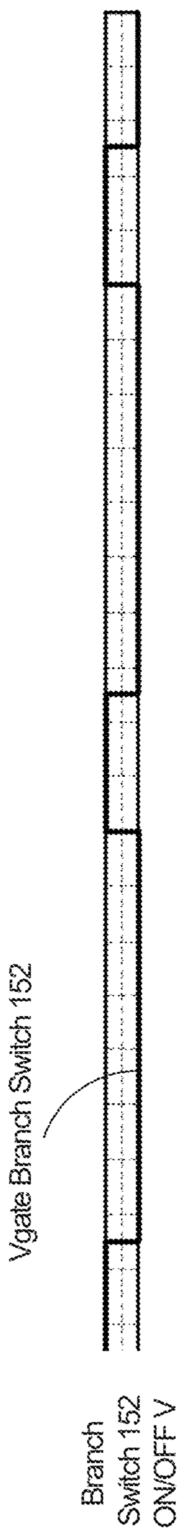

FIG. 5F is analogous to FIG. 5A above. In the example shown in FIG. 5A, the main power-switch 114 is ON from time 0-50 μs, again from 100-150 us and again from 200-250 μs, and the period for the main power-switch includes a 50 μs ON-time and then a 50 μs OFF-time. In the example shown in FIG. 5F the ON time of the main power-switch 114 is the same as in FIG. 5A, at 50 μs. However, in FIG. 5F, the branch switch ON time is less than 50 μs (about 25 μs) and the branch switch is OFF for 75 μs. This means that, because the bias capacitor 110 can only be charged when the branch switch is ON, it will only be charged during 25 us of the main power-switch 114 ON time of 50 μs. FIG. 5F also illustrates periods of the gate voltage of branch switch 152 being in the ON position as value "high" (the bias capacitor 110 being charged by the branch current I6) and periods of the gate voltage of branch switch 152 being in the OFF position as value "low" (the bias capacitor 110 not being charged).

Figure 5G:
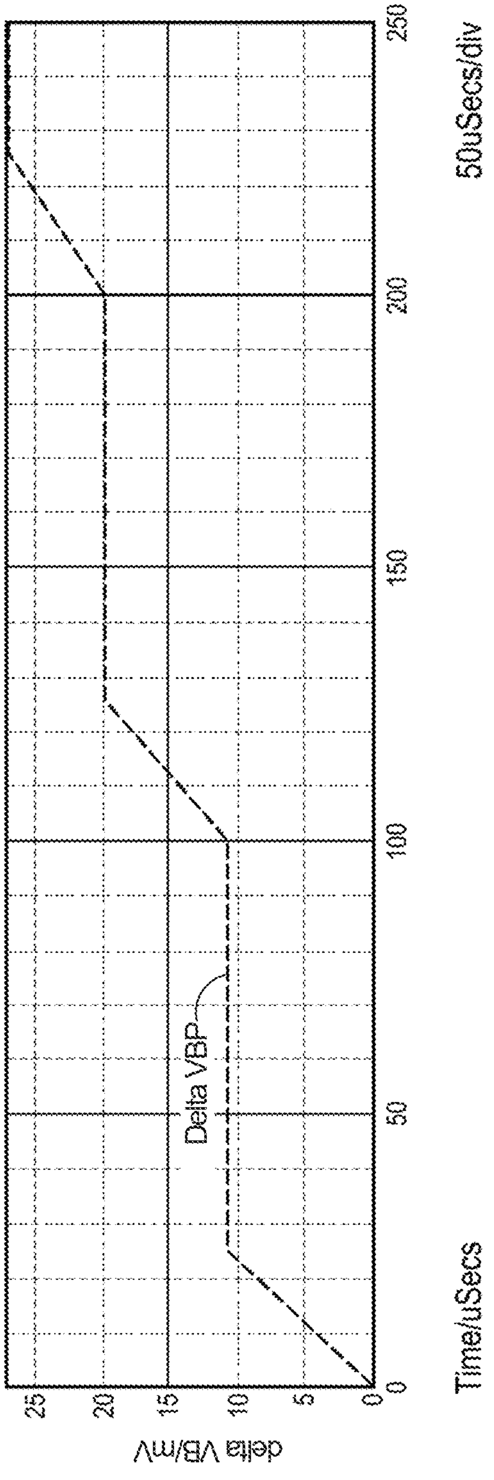

In the example shown in FIG. 5G it can be further seen that the delta VB rises during the 25 us charge periods of the branch switch 152 being in its ON state. These occur at the periods 0-25 μs, 100-125 us and 200-225 μs. For the remainder of the time the delta-VB voltage is flat (i.e. no further charge during flat periods when branch switch 152 is OFF).

Figure 5H:
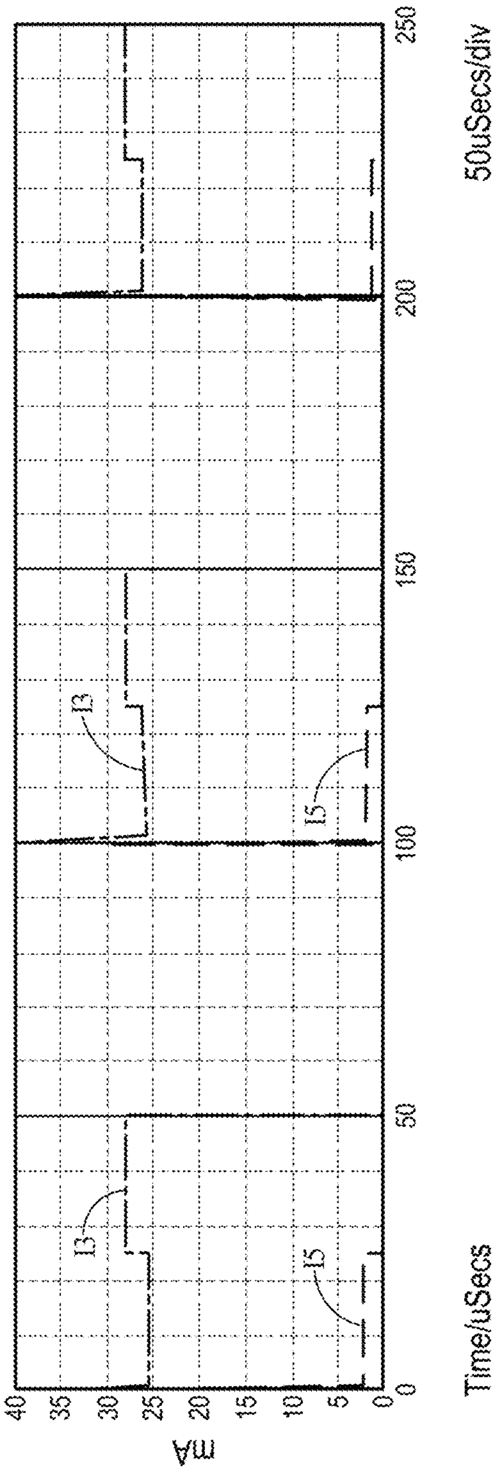

In the example shown in FIG. 5H it can be further seen that the scaled branch current I5 is non-zero and positive during the 25 us charge periods of the branch-switch 152. These occur at periods 0-25 μs, 100-125 us and 200-225 μs. For the remainder of the time the scaled branch current I5 is zero (i.e., no further charge during flat periods while the branch switch 152 is OFF). Also, in the example shown in FIG. 5H the scaled main current I3 reaches maximum value only during the 25 us non-charging periods when the branch switch 152 is OFF. These occur at periods 25-50 μs, 125-150 us and 225-250 μs. However, during the 25 us periods when branch switch 152 is ON, the scaled main current I3 is lower by the amount of the scaled branch current I5. These occur at periods 0-25 μs, 100-125 us and 200-225 μs.

Figure 5I:
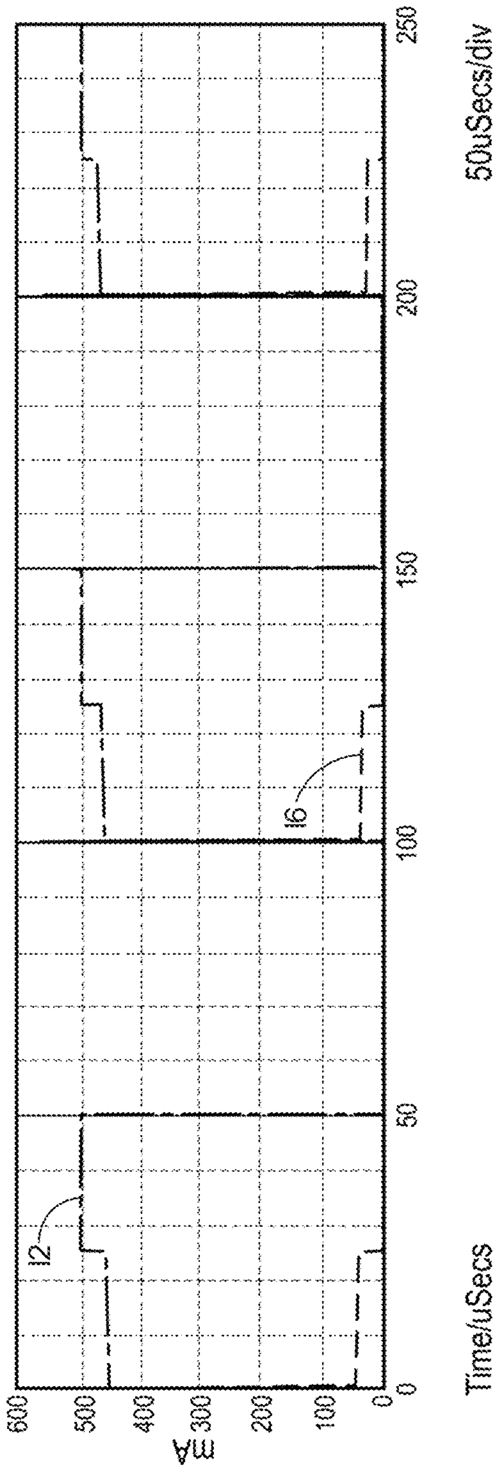

In the example shown in FIG. 5I it can further be seen that the branch current I6 is non-zero and positive during the 25 us charge periods when the branch switch 152 is ON. These occur at periods 0-25 μs, 100-125 us and 200-225 μs. For the remainder of the time the branch current I6 is zero (i.e. no further charge during the flat periods when branch switch 152 is OFF).

Also, in the example shown in FIG. 5I the main current I2 reaches a maximum value only during the 25 us non-charging periods of the branch-switch 152. These occur at periods 25-50 μs, 125-150 us and 225-250 μs. However, during the 25 us periods when the branch switch 152 is ON, the main current I2 is lower by the amount of branch current I6. These occur at periods 0-25 μs, 100-125 μs and 200-225 μs.

Figure 5J:
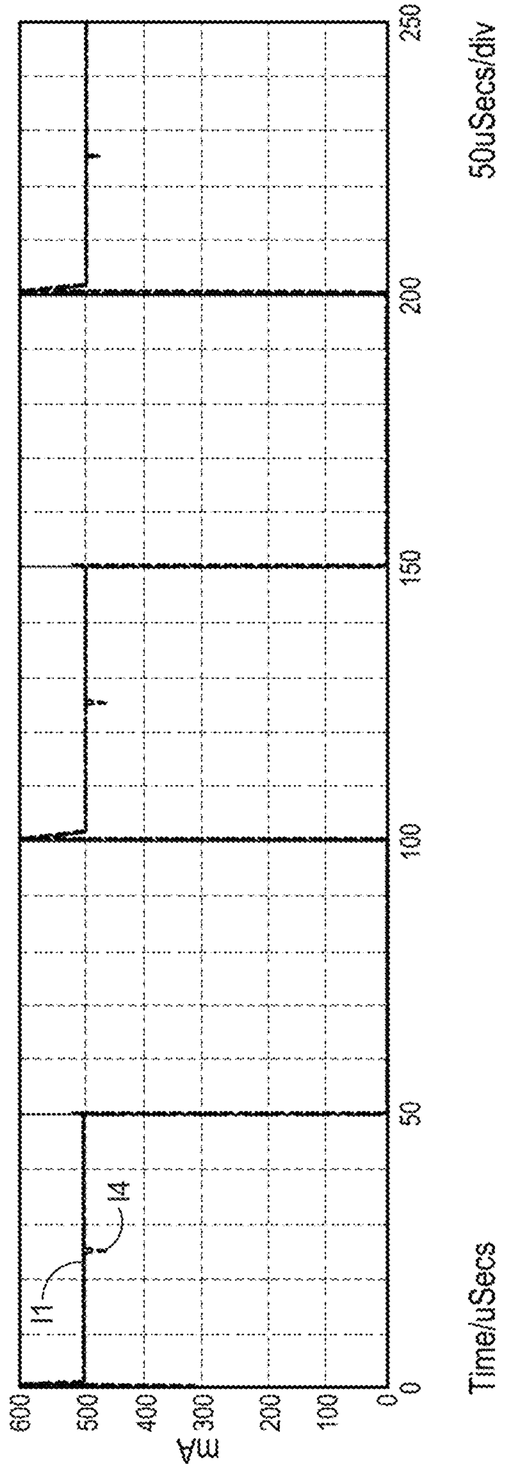

In the example shown in FIG. 5J the total summed current I4 during the 25 μs charge periods when branch switch 152 is ON can be seen. These occur at periods 0-25 μs, 100-125 μs and 200-225 μs. For the remainder of the time, the branch switch 152 is OFF. It can be seen that, whether the branch switch is ON or OFF at any arbitrary time within this observed time span from 0 μs to 250 μs, the first current I1 corresponds to the summed current I4, save for relatively short transient effects at the time of switching of the gate of branch switch 152. Therefore, the correspondence between the first current I1 and the summed current I4 is maintained irrespective of the state of the gate of branch switch 152. Of course, all other relationships among the currents, as in I1=I4=I2+I6=n (I3+I5), are also maintained throughout the observed times on the horizontal axis.

Figure 6:
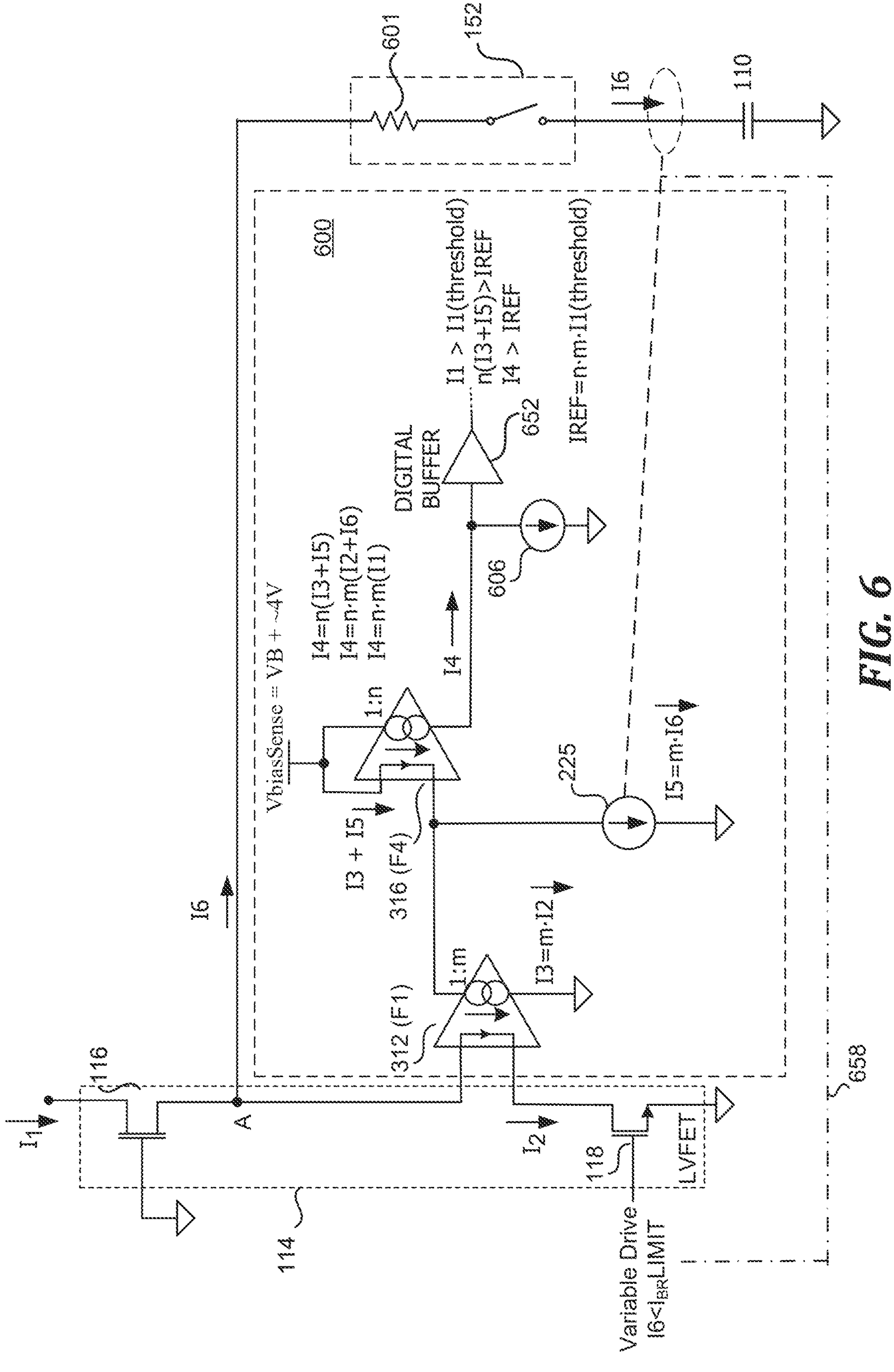
FIG. 6 illustrates an example current limit circuit employing a self-charge circuit in accordance with the teachings of the present disclosure.

FIG. 6 shows one example a current limit circuit 600 using the reconstructed current sense signal in accordance with the present disclosure. In some embodiments, the drain current of the first cascode switch 116, e.g., first current I1, is diverted to the branch current I6 and is delivered through the branch switch 152 but is also limited by a series current limiter 601. In the embodiment of FIG. 6, current limiter 601 is embodied by the inherent impedance of branch switch 152. If the first current I1 is less than the series current limit threshold (IBRLIMIT) for branch current I6, then all of the first current I1 will be diverted to the branch current I6 and the main current I2 will be substantially zero. If the first current I1 is greater than the limit threshold for branch current I6, the remainder (main current I2, where I2=I1−I6), is delivered to the second cascode switch 118. This can also be expressed as I1=I2+I6. Current source 606 generates reference current IREF. Reference current IREF represents a current scaled by a ratio n·m, to represent an equivalent DC threshold value of first current I1, whereby IREF=n·m·I1 (threshold). This DC threshold value may, for example, represent the current limit threshold used by the primary controller to control operation of the cascode device 114. The branch current I6 is sensed by cascaded current mirror 225 and replicated with a scaling ratio m to the scaled branch current I5, whereby I5=m·I6. Trace 658 represents generating the variable drive signal in response to scaled branch current I5. First current mirror 312 (F1) senses main current I2 and mirrors and scales it to provide the scaled main current I3, whereby I3=m·I2. The fourth current mirror 316 (F4) sums the scaled main current I3 and the scaled branch current I5 and outputs scaled and summed current I4 in substantially the same manner as discussed above with regard to FIG. 4. Summed current I4 represents the reconstructed current I1. Reference current IREF is subtracted from summed current I4 and the resulting voltage is input to digital buffer 652. The output of buffer 652 will be logic1 when I4>IREF. Because summed current I4 is a reconstructed scaled version of first current I1, when first current I1 equals I1 (threshold), summed current I4 will equal IREF. Thus, if first current I1 exceeds I1 (threshold), I4 will exceed IREF causing a state change in the output of digital buffer 652. This output may be used to signify that first current I1 has reached the current limit threshold. In the alternative, a current threshold that determines whether the bias capacitor 110 will be charged or not may be implemented.

The series current limiter 601 for the branch current I6, is used for the following reasons. Under certain circumstances, for example high-frequency current variations, the control of current I2 may not fully control the branch current I6. If the series current limiter 601 were not present, then under certain circumstances, substantially all of the first current I1 could be diverted as the branch current I6 through branch switch 152 and delivered to charge the bias capacitor 110. However, components in the charge path from node A to capacitor 110 have a practical limit to the amount of current that they can safely tolerate. Also, non-ideal components may have series resistance and series inductance, both of which will generate voltages in response to high changes in current. It is advantageous to limit the voltage noise/spikes/etc on the bias capacitor 110. For these reasons, using series current limiter 601 provides a supplemental limitation on the amount of charge current I6, such that the current is maintained within the maximum appropriate levels for the components in the charge path to bias capacitor 110.

FIG. 7 is a truth table describing the self-charge operation in accordance with the present disclosure. FIG. 7 includes 3-ON and 1 OFF-state (designated A, B1, B2 and C) that are in response to combinations of PSW and BP_REG input signals and first cascode switch 116, second cascode switch 118 and branch switch 152 gate signals. When PSW=OFF (indicating that the secondary controller has requested to stop power delivery to the output), the first cascode switch 116, second cascode switch 118 and branch switch 152 are all OFF. This is independent of the state of signal BP_REG. This off-state is denoted as state-C.

The truth table has three ON-states (designated A, B1 and B2). On-state A occurs when PSW=ON, and BP_REG=0, meaning that VB is above or equal to REF, meaning that the bias capacitor 110 does not require additional charge. During this state, the first cascode switch 116 and the second cascode switch 118 are both on. In this state, substantially all of first current I1 from the first cascode switch 116 flows as main current I2 in the second cascode switch 118 and substantially zero branch current I6 flows in the branch switch.

On-state B1 occurs when PSW=ON, BP_REG=1 and first current I1<IBRLIMIT. In this state all the first current I1 will flow through as branch current I6 to charge the bias capacitor 110.

On-state B2 occurs when PSW=ON, BP_REG=1 and I1>$I_{BR}$LIMIT. In this state, the first current I1 is divided such that branch current I6 is limited to I6=$I_{BR}$LIMIT, and the remainder will flow as main current I2. This may be described mathematically as:

$$I6 = I_{BR}\ \text{LIMIT}$$

$$I2 = I1 - I6 = I1 - I_{BR}\ \text{LIMIT}$$

In this way, the branch current I6 will provide up to but not exceeding $I_{BR}$LIMIT so as not to exceed the acceptable stress levels of devices in the branch charging path such as the bias capacitor 110, the branch switch 152 or the diode 160.

During ON-state B2 the branch current I6 is limited by means of modulating the main current I2. In turn, the main current I2 is limited/controlled, by modulating the voltage at the gate of the second cascode switch 118 in order to maintain branch current I6 at or below the desired limit current of $I_{BR}$LIMIT.

Numerous specific details are set forth above in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention. For example, skilled artisans will appreciate that elements in the previously described figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in the figures in order to facilitate a less obstructed view of these various embodiments of the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality.

The description of illustrated examples of the present invention, including what is described in the Abstract, are not intended to be exhaustive or to be a limitation to the precise forms disclosed. While specific embodiments of, and examples for, the invention are described herein for illustrative purposes, various equivalent modifications are possible without departing from the broader spirit and scope of the present invention. Indeed, it is appreciated that any specific example voltages, currents, frequencies, power range values, times, etc., are provided for explanation purposes and that other values may also be employed in other embodiments and examples in accordance with the teachings of the present invention.

What is claimed is:

1. A control system for a power converter, the control system comprising:

a branch node coupled to receive a first current from a primary side of an energy transfer element and configured to deliver a main current and a branch current;

at least one branch switch coupled to the branch node and configured to receive the branch current;

a capacitor coupled to the at least one branch switch, the capacitor configured to store electrical charge received from the branch current;

a first current mirror coupled to the branch node and configured to receive the main current and produce a scaled main current;

a second current mirror coupled to the at least one branch switch and configured to receive the branch current and produce a scaled branch current, wherein a first ratio between the main current and the scaled main current is substantially the same as a second ratio between the branch current and the scaled branch current;

a scaled current mirror and adder, coupled to receive the scaled main current and the scaled branch current and configured to produce a summed current; and a variable main driver coupled to the scaled current mirror and adder and configured to produce a variable drive signal in response to the summed current, wherein the variable drive signal is coupled to modulate the main current.

2. The control system of claim 1, wherein the variable drive signal modulates the main current to regulate the branch current to be less than or equal to a maximum value.

3. The control system of claim 1, wherein the at least one branch switch is configured to, when in an ON state, divert the branch current to the capacitor.

4. The control system of claim 1, wherein at least one of the first current mirror and the second current mirror is a cascaded current mirror.

5. The control system of claim 1, the first current mirror further comprising:

a voltage-to-current generator coupled to the branch node; and a transistor coupled to the voltage-to-current generator, configured to receive an output of the voltage-to-current generator and produce the scaled main current.

6. The control system of claim 5, the first current mirror further comprising a voltage clamp circuit coupled to the branch node and to the voltage-to-current generator, the voltage clamp circuit configured to limit voltage excursions within predetermined limits.

7. The control system of claim 6, wherein the voltage clamp circuit is a normally-on transistor.

8. The control system of claim 1, the second current mirror comprising:

a first branch current mirror coupled to the at least one branch switch, configured to provide a sensed current indicative of the branch current; and a second branch current mirror coupled to the first branch current mirror, configured to receive the sensed current and produce the scaled branch current.

9. The control system of claim 1, the variable main driver comprising:

a reference current source configured to generate a reference current, wherein the reference current represents a maximum limit for the branch current;

a comparison node coupled to receive the scaled branch current and the reference current and configured to generate an output in response to a comparison between the scaled branch current and the reference current, and a voltage buffer coupled to the output of the comparison node and configured to produce the variable drive signal.

10. The control system of claim 9, the control system comprising:

a cascode device comprising a first cascode switch and a second cascode switch connected in series, wherein the first cascode switch is coupled to the primary side of the energy transfer element and the branch node and the second cascode switch is coupled to the branch node and configured to receive the variable drive signal.

11. The control system of claim 10, wherein the variable main driver is coupled to modulate conduction in the second cascode switch such that the second cascode switch preferentially conducts excess current to limit the branch current in response to the branch current exceeding the reference current.

12. The control system of claim 11, further comprising:

a sense switch having a source, a gate and a drain, wherein the sense switch is coupled such that the sense switch shares a gate node and a source node with the second cascode switch, wherein the sense switch has a scaled rds (on) with respect to the second cascode switch; and wherein the scaled main current generates a voltage on the drain of the sense switch which matches a voltage on a drain of the second cascode switch generated by the main current.

13. The control system of claim 12, further comprising:

a first controller coupled to the scaled current mirror and adder, wherein the first controller is configured to control conduction of the cascode device and the at least one branch switch to control a transfer of energy from a power converter input to a power converter output.

14. The control system of claim 13, wherein the first controller is coupled to receive the summed current and configured to control conduction of the cascode device, at least in part, in response to the summed current.

15. The control system of claim 14, the control system further comprising:

a second controller coupled to receive a feedback signal representing an output quantity sensed at a secondary side of the energy transfer element and generating a request signal; and wherein the first controller is coupled to receive the request signal and configured to set the first cascode switch and the second cascode switch to an ON or an OFF state at least in part in response to the request signal.

16. The control system of claim 1, the control system further comprising:

a power switch coupled to the branch node and the primary side of an energy transfer element, the power switch configured to receive the variable drive signal, wherein the variable drive signal modulates conduction in the power switch.

17. The control system of claim 16, the variable main driver comprising:

a reference current source configured to generate a reference current, wherein the reference current represents a maximum limit for the branch current;

a comparison node coupled to receive the scaled branch current and the reference current and configured to generate an output in response to a comparison between the scaled branch current and the reference current, and a voltage buffer coupled to the output of the comparison node and configured to produce the variable drive signal.

18. The control system of claim 17, wherein the variable main driver is coupled to modulate the conduction in the power switch such that the power switch preferentially conducts excess current to limit the branch current in response to the branch current exceeding the reference current.

19. The control system of claim 16, the first current mirror further comprising:

a voltage-to-current generator coupled to receive an input from the power switch and configured to generate an output in response; and a transistor coupled to the output of the voltage-to-current generator and configured to produce the scaled main current.

20. The control system of claim 16, the second current mirror comprising:

a first branch current mirror coupled to the at least one branch switch, configured to provide a sensed current indicative of the branch current; and a second branch current mirror coupled to the first branch current mirror, configured to receive the sensed current and produce the scaled branch current.

21. The control system of claim 1, wherein:

the power converter comprises a primary side and a secondary side that are galvanically isolated from one another.

22. The control system of claim 1, wherein the at least one branch switch comprises a first branch switch and a second branch switch, and wherein the second branch switch is coupled to the branch node and to a second capacitor.

23. A control system for a power converter, the control system comprising:

a branch node coupled to receive a first current from a primary side of an energy transfer element and configured to deliver a main current and a branch current;

at least one branch switch coupled to the branch node and configured to receive the branch current;

a capacitor coupled to the at least one branch switch, the capacitor configured to store electrical charge received from the branch current;

a first voltage scaling circuit coupled to the branch node and configured to receive a main voltage indicative of the main current and produce a scaled main voltage;

a second voltage scaling circuit coupled to the at least one branch switch and configured to receive a branch voltage indicative of the branch current and produce a scaled branch voltage, wherein a first ratio between the main voltage and the scaled main voltage is the same as a second ratio between the branch voltage and the scaled branch voltage;

a voltage scaler and adder, coupled to the first voltage scaling circuit and the second voltage scaling circuit and the primary side of the energy transfer element, configured to receive the scaled main voltage and the scaled branch voltage and produce a summed voltage; and a variable main driver coupled to the energy transfer element and the voltage scaler and adder and configured to produce a variable drive signal in response to the summed voltage, wherein the variable drive signal modulates the main current.

24. The control system of claim 23, further comprising:

a cascode device comprising a first cascode switch and a second cascode switch connected in series, wherein the first cascode switch is coupled to the primary side of the energy transfer element and the branch node and the second cascode switch is coupled to the branch node and configured to receive the variable drive signal.

25. The control system of claim 24, wherein the variable main driver is coupled to modulate conduction in the second cascode switch such that the second cascode switch preferentially conducts excess current to limit the branch current in response to the branch current exceeding a threshold.

26. The control system of claim 25, further comprising:

a first controller coupled to the voltage scaler and adder, wherein the first controller is configured to control conduction of the cascode device and the at least one branch switch to control a transfer of energy from a power converter input to a power converter output.

27. A method for controlling a power converter, the method comprising:

receiving a first current from a primary side of an energy transfer element;

dividing the first current into a main current and a branch current, wherein the main current is received by a main switch and the branch current is received by at least one branch switch;

scaling the main current to produce a scaled main current;

scaling the branch current to produce a scaled branch current, wherein a first ratio between the main current and the scaled main current is the same as a second ratio between the branch current and the scaled branch current;

combining the scaled main current and the scaled branch current to produce a summed current, wherein the summed current is representative of the first current;

producing a variable drive signal indicative of a difference between the summed current and a reference current; and modulating the main current in response to the variable drive signal.

28. The method of claim 27, wherein the step of producing a variable drive signal further comprises comparing the scaled branch current and the reference current, wherein the reference current represents a maximum limit for the branch current.

29. The method of claim 28, wherein the step of modulating the main current in response to the variable drive signal comprises increasing a magnitude of the main current, thereby reducing the branch current, in response to the scaled branch current exceeding the reference current.

30. The method of claim 29, wherein the main switch is a power switch coupled to the primary side of the energy transfer element and the variable drive signal determines a drive voltage to be coupled to a gate of the power switch.

31. The method of claim 29, wherein the main switch is a cascode device comprising a first cascode switch and a second cascode switch connected in series, wherein the first cascode switch is coupled to the primary side of the energy transfer element and the branch node, and the second cascode switch is coupled to the branch node and configured to receive the main current and the variable drive signal.

32. A control system, the control system comprising:

a branch node coupled to receive a first current and configured to deliver a main current and a branch current;

at least one branch switch coupled to the branch node and configured to receive the branch current;

a capacitor coupled to the at least one branch switch, the capacitor configured to store electrical charge received from the branch current;

a first current mirror coupled to the branch node and configured to receive the main current and produce a scaled main current;

a second current mirror coupled to the at least one branch switch and configured to receive the branch current and produce a scaled branch current, wherein a first ratio between the main current and the scaled main current is substantially the same as a second ratio between the branch current and the scaled branch current;

a scaled current mirror and adder, coupled to receive the scaled main current and the scaled branch current and configured to produce a summed current; and a variable main driver coupled to the scaled current mirror and adder and configured to produce a variable drive signal in response to the summed current, wherein the variable drive signal is coupled to modulate the main current.

* * * * *